(12) United States Patent
Okuno et al.

(10) Patent No.: US 12,617,338 B2
(45) Date of Patent: May 5, 2026

(54) VEHICULAR LIGHT SYSTEM

(71) Applicant: Stanley Electric Co., Ltd., Tokyo (JP)

(72) Inventors: Toshiyuki Okuno, Tokyo (JP); Hiroshi Miura, Tokyo (JP); Hisashi Asaga, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 4 days.

(21) Appl. No.: 18/728,293

(22) PCT Filed: Dec. 23, 2022

(86) PCT No.: PCT/JP2022/047532
§ 371 (c)(1),
(2) Date: Jul. 11, 2024

(87) PCT Pub. No.: WO2023/136090
PCT Pub. Date: Jul. 20, 2023

(65) Prior Publication Data
US 2025/0100444 A1 Mar. 27, 2025

(30) Foreign Application Priority Data
Jan. 11, 2022 (JP) ................................ 2022-002385

(51) Int. Cl.
B60Q 1/50 (2006.01)
B60Q 1/00 (2006.01)
(Continued)

(52) U.S. Cl.
CPC ........... B60Q 1/549 (2022.05); B60Q 1/0017 (2013.01); B60Q 3/70 (2017.02); B60Q 3/80 (2017.02);
(Continued)

(58) Field of Classification Search
CPC ........ B60Q 1/549; B60Q 1/0017; B60Q 3/70; B60Q 3/80; B60Q 2400/40;
(Continued)

(56) References Cited

U.S. PATENT DOCUMENTS

| 2008/0136660 A1* | 6/2008 | Bailey | H05B 47/155 |
| | | | 340/815.45 |
| 2018/0037155 A1* | 2/2018 | Danowski | B60Q 1/482 |
| 2020/0304943 A1 | 9/2020 | Sakurai et al. | |

FOREIGN PATENT DOCUMENTS

| JP | 2014-94611 A | 5/2014 |
| JP | 2020-152163 A | 9/2020 |

OTHER PUBLICATIONS

International Search Report and Written Opinion for PCT/JP2022/047532 dated Jan. 24, 2023.

* cited by examiner

*Primary Examiner* — Daryl C Pope
(74) *Attorney, Agent, or Firm* — Kenealy Vaidya LLP

(57) ABSTRACT

Provided is a vehicle light system using existing interior lamps and exterior lamps, the interior lamps and the exterior lamps cooperating to provide dramatic illumination. The vehicle light system can include: a lighting control unit that generates and outputs a control signal for controlling the turning on and off of both the exterior lamps and the interior lamps; a light source driving unit that drives the light source of any lamp of the vehicle lamp group on the basis of the control signal provided from the lighting control unit; an in-vehicle device that is mounted on the vehicle and that has a wireless communication function; a portable device that can be carried outside the vehicle by an occupant of the vehicle and that has a wireless communication function with the in-vehicle device; and an in-vehicle network configured to connect the in-vehicle device and the lighting control unit.

(Continued)

The lighting control unit acquires positional information for the portable device through the in-vehicle network, and generates and outputs a control signal whereby both the interior lamps and the exterior lamps cooperate to provide lighting when the occupant enters a predetermined range. The commercial value of a vehicle light can thereby be increased.

14 Claims, 10 Drawing Sheets

(51) Int. Cl.
  *B60Q 3/70* (2017.01)
  *B60Q 3/80* (2017.01)
(52) U.S. Cl.
  CPC ...... *B60Q 2400/40* (2013.01); *B60Q 2900/30*
  (2013.01)
(58) Field of Classification Search
  CPC ...... B60Q 2900/30; B60Q 1/247; B60Q 1/00;
  B60Q 1/143; Y02B 20/40
  See application file for complete search history.

Fig. 7A

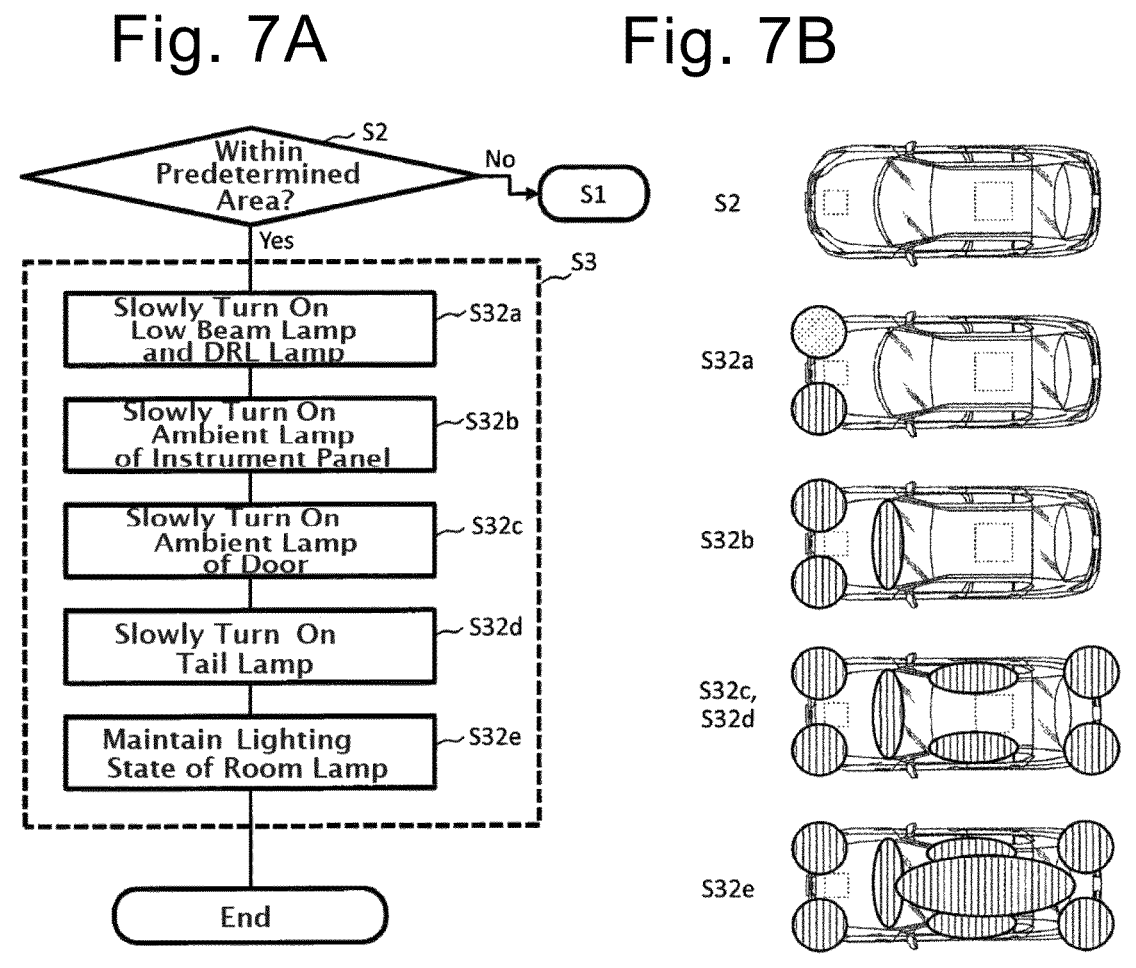

```
                    S2
        Within                  No
      Predetermined    ────────────→   S1
         Area?
         │ Yes
    ┌ ─ ─│─ ─ ─ ─ ─ ─ ─ ─ ─ ┐  S3
    │    ▼                    │
    │ ┌──────────────────┐    │
    │ │  Slowly Turn On   │── S32a
    │ │  Low Beam Lamp    │    │
    │ │  and DRL Lamp     │    │
    │ └──────────────────┘    │
    │ ┌──────────────────┐    │
    │ │  Slowly Turn On   │── S32b
    │ │  Ambient Lamp     │    │
    │ │ of Instrument Panel│   │
    │ └──────────────────┘    │
    │ ┌──────────────────┐    │
    │ │  Slowly Turn On   │── S32c
    │ │  Ambient Lamp     │    │
    │ │    of Door        │    │
    │ └──────────────────┘    │
    │ ┌──────────────────┐    │
    │ │  Slowly Turn On   │── S32d
    │ │    Tail Lamp      │    │
    │ └──────────────────┘    │
    │ ┌──────────────────┐    │
    │ │ Maintain Lighting │── S32e
    │ │ State of Room Lamp│    │
    │ └──────────────────┘    │
    └ ─ ─│─ ─ ─ ─ ─ ─ ─ ─ ─ ┘
         ▼
    (      End      )
```

Figures 8A, 8B:
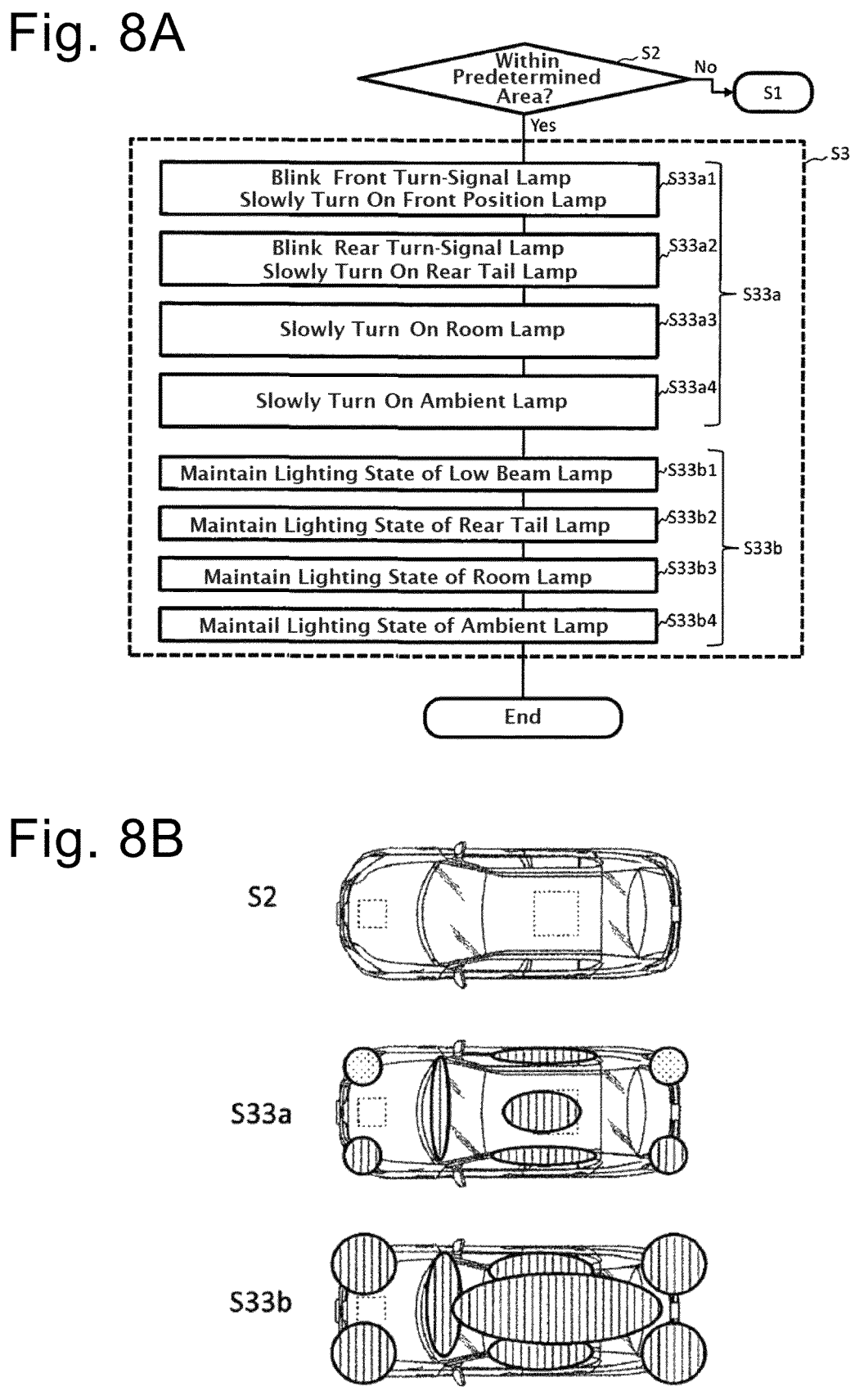

Within Predetermined Area? — S2 — No → S1

Yes

S3

| Blink Front Turn-Signal Lamp Slowly Turn On Front Position Lamp | S33a1 |
| Blink Rear Turn-Signal Lamp Slowly Turn On Rear Tail Lamp | S33a2 |
| Slowly Turn On Room Lamp | S33a3 |
| Slowly Turn On Ambient Lamp | S33a4 |

S33a

| Maintain Lighting State of Low Beam Lamp | S33b1 |
| Maintain Lighting State of Rear Tail Lamp | S33b2 |
| Maintain Lighting State of Room Lamp | S33b3 |
| Maintail Lighting State of Ambient Lamp | S33b4 |

S33b

End

VEHICULAR LIGHT SYSTEM

This application is a U.S. National Stage Application under 35 U.S.C § 371 of International Patent Application No. PCT/JP2022/047532 filed Dec. 23, 2022, and claims the benefit of priority under 35 U.S.C. § 119 to Japanese Patent Application No. 2022-002385 filed Jan. 11, 2022, the disclosures of all of which are hereby incorporated by reference in their entireties.

TECHNICAL FIELD

The presently disclosed subject matter relates to lighting control for vehicles, and more particularly, to a vehicle light system that turns on in cooperation with a control device such as a keyless entry system.

BACKGROUND ART

There is a system in which a key of a door of a vehicle (automobile) is unlocked and locked via remote control by radio or infrared rays, and it is called a keyless entry system. The keyless entry system is configured to transmit a call radio wave from the vehicle and prepare to unlock the door if there is a response from a key held by an operator. For example, Patent Literature 1 discloses an apparatus provided with a human-detecting sensor that operates with lower power in addition to a keyless entry system. With this apparatus, the vehicle does not emit radio waves when the human-detecting sensor does not sense the approach of a person, and the vehicle transmits the call radio waves for the keyless entry system when the human-detecting sensor detects the approach of a person. As a result, power consumption can be suppressed.

As other technologies, a vehicle surroundings monitoring sensor is known. This sensor emits radar radio waves, sound waves, or the like from a vehicle to the surroundings and detects a signal reflected from a surrounding object and thus is useful for improving vehicle safety in various manners, including by preventing contact during parking operation. A vehicle security device that prevents theft damage is also known. For example, Patent Literature 2 proposes a system in which, when an alarm condition such as theft or tampering of a vehicle is detected, a deterrence, with regards to an act of theft, is performed by blowing a horn, lighting of a lamp, or the like, and an alarm signal is transmitted to a portable device of an owner of the vehicle to call attention.

On the other hand, many occasions in which a keyless entry system is used are in parking lots where many vehicles are parked. In such a place, it may be difficult to find a vehicle unless one goes near the own parked vehicle. In particular, when similar vehicles are parked in near locations, a key of a door of a vehicle different from that of the vehicle owned by oneself is attempted to be opened, which is a problem. In order to solve such a problem, vehicles equipped with a system for lighting an interior lamp in synchronization with unlocking of a door has also been put into practical use. However, even in such a case, a large number of crowded vehicles are often parked in the parking lot, and thus it is difficult to find the vehicle owned by oneself. Further, in this case, it is conceivable to perform the same operation as in the case of a deterrence with regards to an act of theft by blowing a horn, lighting a lamp, or the like as in the vehicle security device of Patent Literature 2. However, such a case of system activation would involve a deterrence with regards to an act of the theft, and thus there is a high risk of erroneously determining that a security problem such as theft has occurred.

CITATION LIST

Patent Literature

Patent Literature 1: Japanese Patent Application Laid-Open No. 2001-295523
Patent Literature 2: Japanese Patent Application Laid-Open No. H07-165019

SUMMARY

Technical Problem

A problem to be solved by the presently disclosed subject matter is that there is no mechanism whereby the vehicle can give an impression of appearing to welcome the occupant, instead of lighting a lamp that is recognized as a warning display such as that used in deterrence with regards to an act of the theft.

In order to solve the above-mentioned problems, a specific aspect according to the presently disclosed subject matter is to provide a vehicle light system that allows the vehicle itself to be recognized via light sources including an interior lamp and an outdoor vehicle lamp being activated in a vehicle body in a predetermined manner, this system not only making it easier for an occupant to find the vehicle in a parking lot, for example, but also providing an illumination that can show the vehicle design appealingly to an occupant.

Solution to Problem

One aspect of the presently disclosed subject matter is,

[1] a vehicle light system comprising:

a vehicle lamp group including an exterior lamp group including a plurality of lamps configured to illuminate an outside of a vehicle, and that include a lamp arranged in a front part of a vehicle and a lamp arranged in a rear part of the vehicle, and an interior lamp group including a plurality of lamps configured to illuminate an inside of the vehicle and that include at least a room lamp and an ambient lamp, wherein each of the lamps is provided with at least one light source;

a lighting controller configured to generate and output a control signal for controlling the turning on and off of the pluralities of lamps included in the vehicle lamp group;

a light source driver configured to receive the control signal output from the lighting controller, and to drive, based on the control signal, the light source of a predetermined lamp among the pluralities of lamps of the vehicle lamp group;

an in-vehicle device that is to be mounted on the vehicle and that has a wireless communication function;

a portable device that an occupant of the vehicle can bring outside the vehicle and that has a wireless communication function with the in-vehicle device; and an in-vehicle network configured to connect the in-vehicle device and the lighting controller, wherein:

the in-vehicle device outputs positional information about the portable device based on wireless communication information with the portable device to the in-vehicle network, the lighting controller is configured to acquire the positional information through the in-vehicle network, the lighting controller is configured to output a first control signal for controlling the exterior lamp group, and output a second control signal for controlling the interior lamp group, when a distance between the portable device and the vehicle is shorter than a predetermined distance;

the light source driver is configured to drive a light source of a predetermined lamp among the plurality of lamps of the exterior lamp group based on the first control signal to bring the vehicle into a first illumination state; and after the vehicle is in the first illumination state, the light source driver is configured to drive a light source of a predetermined lamp among the plurality of lamps of the interior lamp group based on the second control signal to bring the vehicle into a second illumination state, and thereby illuminates the vehicle so as to cause the occupant carrying the portable device to recognize the design of the vehicle.

[2] In the vehicle light system of [1], the first control signal is (A) a control signal for gradually increasing the light intensity of a light source of a predetermined lamp among the plurality of lamps of the exterior lamp group from an off state to turn on the light source, or (B) a control signal for turning on a light source of a predetermined lamp among a plurality of lamps of the exterior lamp group from the off-state to a lighting state at a predetermined light intensity, and then gradually decreasing the light intensity, and the second control signal is a control signal for turning on, and continuously maintaining, at a predetermined light intensity, a light source of either the room lamp or ambient lamp among the plurality of lamps of the interior lamp group.

[3] Alternatively, in the vehicle light system of [1], the in-vehicle device outputs information related to a direction of movement of the portable device and a distance between the portable device and the in-vehicle device as positional information about the portable device to the in-vehicle network, the first control signal is a signal for controlling the plurality of lamps so that the plurality of lamps of the exterior lamp group light up starting from a light source of a lamp close to the portable device, and the light sources of the plurality of lamps in the vicinity are controlled so as to be sequentially turned on, in a manner where the light sources light up, starting from the closest lamp and going around the vehicle periphery, and the second control signal is a control signal for controlling a light source of at least either the room lamp or the ambient lamp among the plurality of lamps of the interior lamp group, wherein this light source is to be turned on while continuously maintaining a predetermined light intensity.

According to the presently disclosed subject matter, it is possible to control the plurality of lamps belonging to the exterior lamp group and the plurality of lamps belonging to the interior lamp group, the lamps having different functions, using the same lighting control unit or controller. With this configuration, the lamps of the exterior lamp group and the lamps of the interior lamp group, which essentially do not operate in association with each other are turned on/off in cooperation with each other, and thus the commercial value of the vehicle light system and the vehicle including the same can be increased.

Another aspect of the presently disclosed subject matter is the vehicle light system of [1] or [2], wherein

[4] the lighting controller is configured to output a third control signal between a period in which the first illumination state is maintained and a period in which the second illumination state is maintained, and the light source driver is configured to drive a light source of a predetermined lamp in the vehicle lamp group based on the third control signal to bring the vehicle into a third illumination state.

Another aspect according to the presently disclosed subject matter is the vehicle light system of [4], wherein

[5] the third control signal is a control signal for controlling the driving of at least one light source of the room lamp and the ambient lamp to cause the light source to be turned on by gradually increasing the light intensity.

Alternatively, another aspect of the presently disclosed subject matter is the vehicle light system of [4], wherein

[6] the third control signal is a control signal for performing a control operation whereby the driving of at least one light source of the room lamp and the ambient lamp causes the light source to be turned on by a gradual increase in the light intensity, after which a predetermined light intensity is maintained in the predetermined lamp, which is turned on by the first control signal, and this lighting state is continued.

Another aspect according to the presently disclosed subject matter is the vehicle light system of any one of [1], [2], and [4] to [6], wherein

[7] the lamp disposed in the front part of the vehicle includes a lamp provided at a front corner of the vehicle, and a lamp disposed in the rear part of the vehicle includes a lamp provided at a rear corner of the vehicle, and the light source controlled based on the first control signal is a light source of the lamp, among the lamp provided at the front corner of the vehicle and the lamp provided at the rear corner of the vehicle, that is closer to the position of the portable device indicated by the positional information.

Another aspect according to the presently disclosed subject matter is the vehicle light system of any one of [1] to [7], wherein

[8] the light source of the lamp is an LED.

According to one aspect of the presently disclosed subject matter, since the light system is controlled by a predetermined control, the vehicle itself can be recognized by the occupant, and can allow for an occupant to easily find the vehicle in, for example, a parking lot. Further, there is provided a vehicle light system that provides illumination that can show vehicle designs in an appealing manner to occupants in a variety of ways. According to the vehicle light system, it is possible to produce an image in which the vehicle awakens and an image in which the vehicle is given a sense of life. In addition, the contour of the vehicle can emerge to highlight the design of the form of the vehicle for an occupant. With such a configuration, it is possible to achieve a dramatic effect where the vehicle appears as if it is expressing thoughts of being ready to welcome the occupant via the lighting.

Advantageous Effects

According to the above-described configuration, it is possible to provide a vehicle light system with vehicle illumination that allows the vehicle itself to be recognized, making it easier to find in a parking lot, for example, and that shows the vehicle design in an appealing manner to an occupant. In addition, there is an advantage in that the vehicle light system and the vehicle including the same can be increased in commercial value.

BRIEF DESCRIPTION OF DRAWINGS

FIG. 7 includes diagrams for describing lighting states of lamps according to a second embodiment, wherein FIG. 7A is a flow diagram showing control, and FIG. 7B includes a plurality of schematic plan views showing positions of lamps to be turned on corresponding to the flow.

FIG. 8 includes diagrams for describing lighting states of lamps according to a third embodiment, wherein FIG. 8A is a flow diagram showing control, and FIG. 8B includes a plurality of schematic plan views showing positions of lamps to be turned on corresponding to the flow.

FIG. 9 includes diagrams for describing lighting states of the lamps according to a fourth embodiment, wherein

FIG. 10 includes diagrams for describing lighting states of the lamps according to a fifth embodiment, wherein

DESCRIPTION OF EMBODIMENTS

Hereinafter, a vehicle light system according to an embodiment of the presently disclosed subject matter will be described with reference to the drawings.

Figure 1:
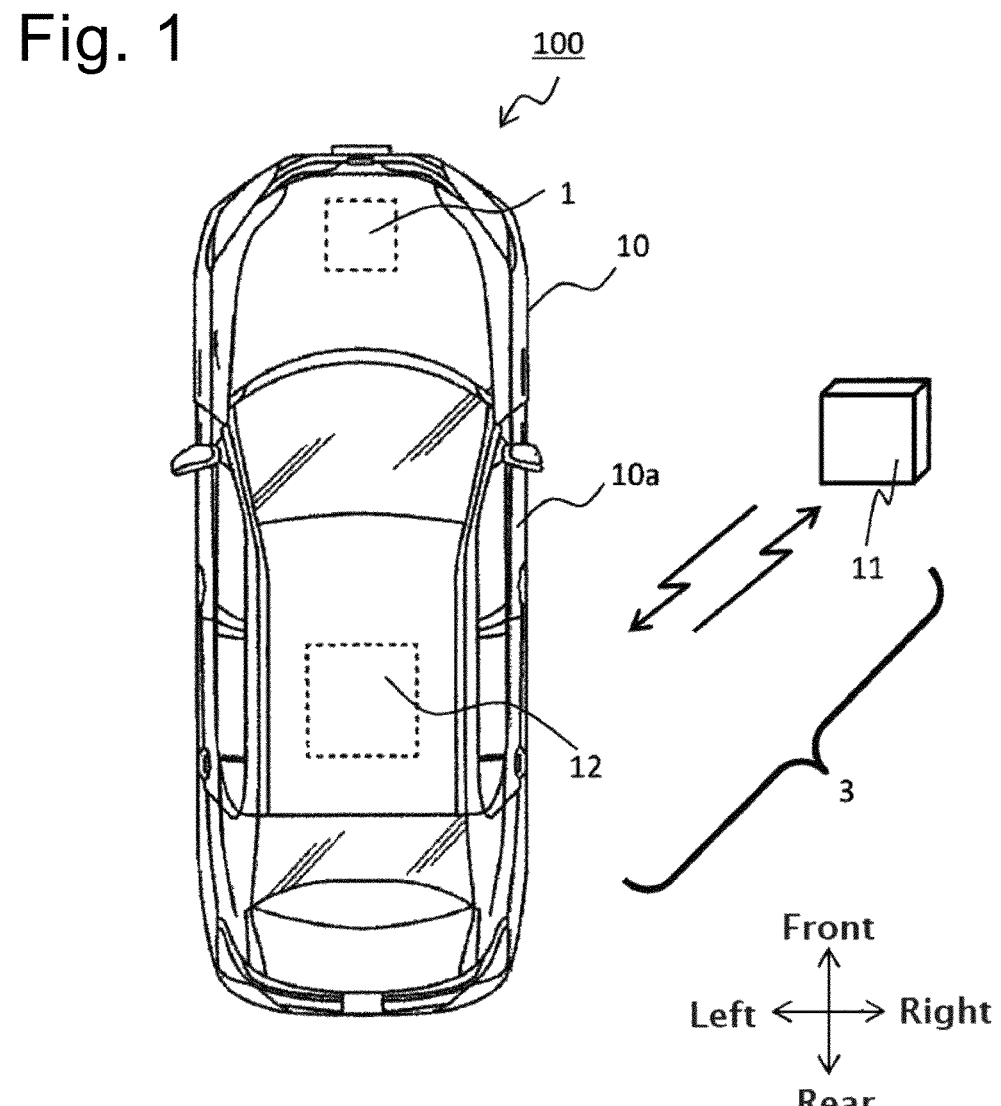
FIG. 1 is a schematic diagram illustrating a configuration of a vehicle light system 100 according to an embodiment.

FIG. 1 is a diagram showing a configuration of a vehicle light system 100 according to an embodiment of the presently disclosed subject matter. The illustrated vehicle light system uses a plurality of lamps in a vehicle, and is configured to include a lighting control device 1, a lamp group 2 (see FIG. 4) that is controlled to be turned on by the lighting control device 1, and a keyless entry device 3.

First, the keyless entry device 3 (also referred to as a smart entry system), which is a keyless entry system, will be described.

Figure 2:
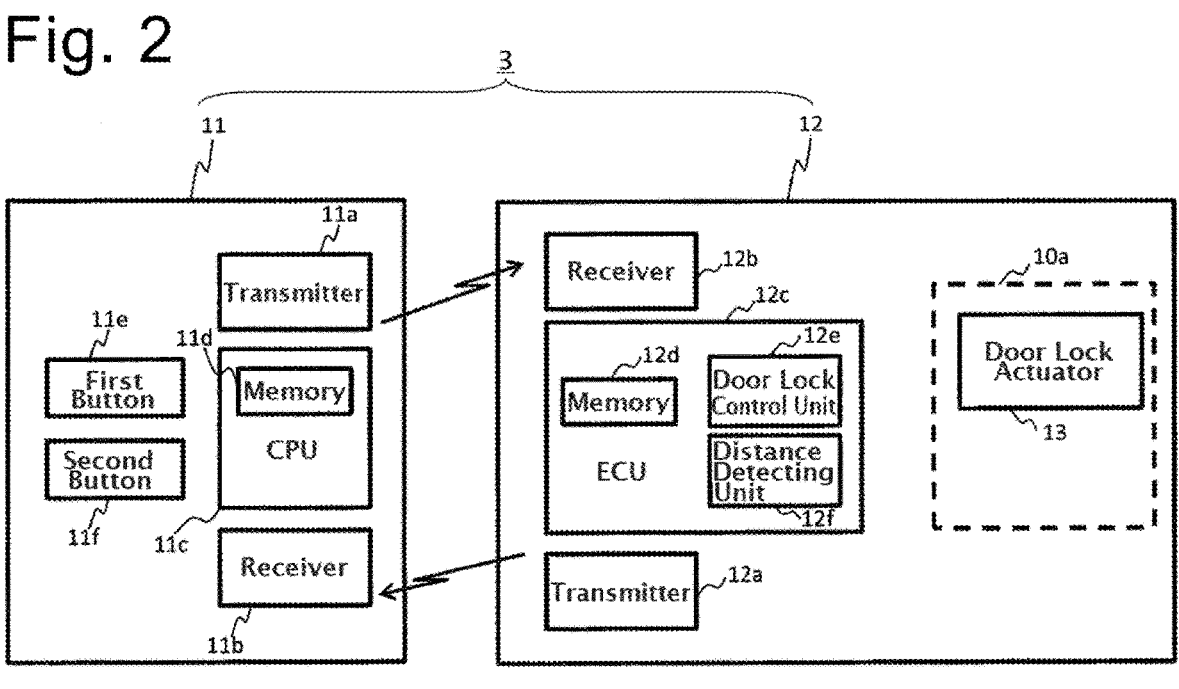
FIG. 2 is a schematic diagram illustrating a configuration example of a keyless entry device 3 according to the present embodiment.
Figure 3:
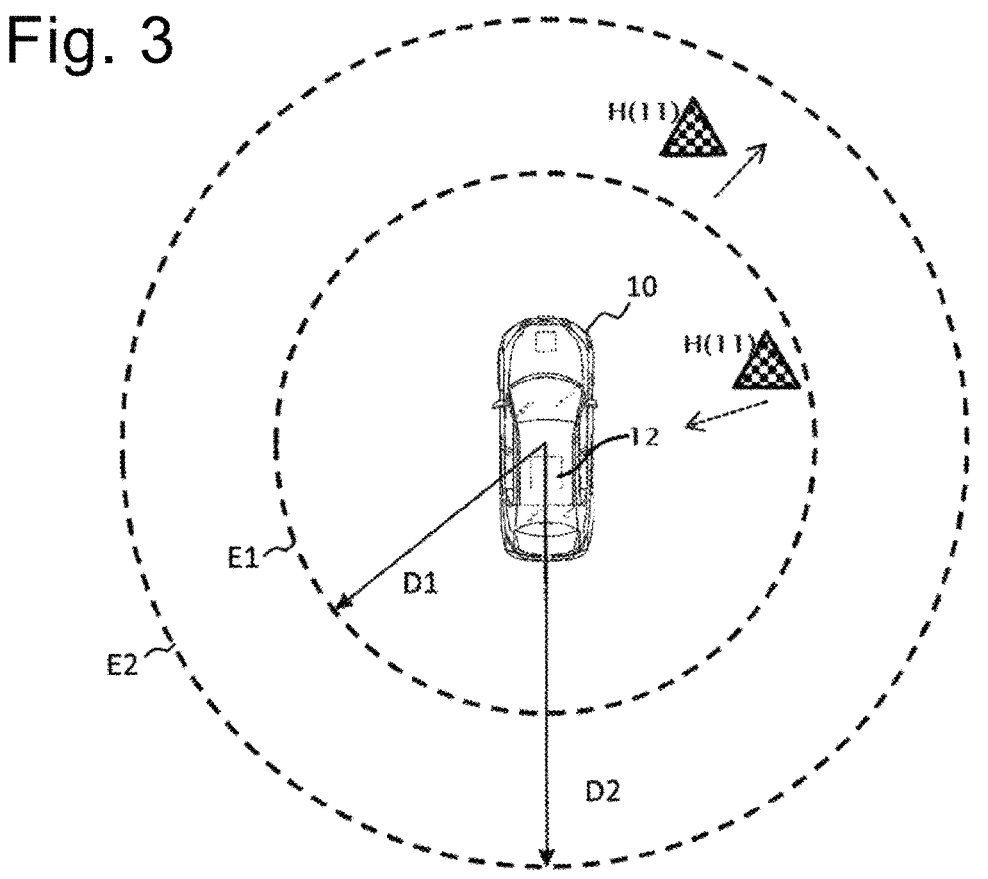
FIG. 3 is an explanatory diagram schematically illustrating a relationship between a vehicle-side device 12 and a communication-enabled distance with a portable device 11.

FIG. 2 is a schematic diagram illustrating a configuration example of the keyless entry device 3 according to the present embodiment. The keyless entry device 3 in the present embodiment is configured to lock or unlock a door 10a of the vehicle 10, and is constituted by a vehicle-side device (in-vehicle device) 12 provided on the vehicle 10 and a portable device 11 that is an electronic key carried by an occupant who is a user. Each of the vehicle-side device 12 and the portable device 11 of the keyless entry device 3 has a wireless communication function, so that wireless communication can be performed between them to perform authentication of an occupant, a door lock/unlock command, and the like. FIG. 3 is an explanatory diagram schematically illustrating a relationship between the vehicle-side device 12 and a communication-enabled distance with the portable device 11.

As illustrated in FIG. 2, the portable device 11 includes a portable device transmitter 11a, a portable device receiver 11b, a portable device control unit 11c including a CPU, a memory 11d, a button 11e (first button), and a button 11f (second button). The portable device transmitter 11a continuously or intermittently transmits a wireless signal (radio wave signal). The portable device receiver 11b receives a request signal transmitted from the vehicle-side device 12, which will be described later. The memory 11d stores various types of data and programs, and the portable device control unit 11c performs control to intermittently output a radio wave signal from the portable device transmitter 11a in a predetermined cycle on the basis of the program stored in the memory 11d. The button 11e (first button) is a switch that instructs the control unit to transmit an unlock signal for an occupant to manually switch the door 10a from the locked state to the unlocked state. The button 11f (second button) is a switch that instructs the control unit to transmit a lock signal for an occupant to manually switch the door 10a from the unlocked state to the locked state. Although not illustrated, a switch for stopping transmission of the radio wave signal is also provided. The portable device control unit 11c performs various operations on the basis of a command included in the request signal transmitted from the vehicle-side device 12. The memory 11d also includes various types of data that are required for realizing authenticated communication with the vehicle-side device 12, data such as ID information (smart key ID) unique to the portable device 11 and ID information (in-vehicle device ID) for distinguishing the vehicle-side device 12.

As illustrated in FIG. 2, the vehicle-side device 12 includes a vehicle-side transmitter 12a, a vehicle-side receiver 12b, and a vehicle-side control unit 12c including an ECU configured to perform various controls. The vehicle-side transmitter 12a transmits a request signal to the portable device 11, and the vehicle-side receiver 12b receives an answer signal transmitted from the portable device 11. The vehicle-side control unit 12c includes a memory 12d, a door lock control unit 12e, and a distance detecting unit 12f. The door lock control unit 12e controls a door lock mechanism 13 that includes a door lock actuator configured to open and close the door lock. The distance detecting unit 12f detects a distance from the occupant carrying the portable device 11 to the vehicle on the basis of the reception level of the radio wave signal that is received by the vehicle-side receiver 12b. The memory 12d stores various data and programs used in these processes.

Although not illustrated, the vehicle-side control unit 12c includes, for example, an ECU including a CPU, a RAM, and a ROM. The vehicle-side control unit 12c functions as a door-lock control unit when the CPU reads a predetermined program from the ROM into the RAM and executes the program.

The vehicle-side device 12 is connected to an in-vehicle network NW, and outputs information, such as the position of the occupant carrying the portable device 11 or the direction toward the occupant, to the in-vehicle network NW as a predetermined signal, this information being detected by the distance detecting unit 12*f*. The vehicle-side device 12 performs communication according to a predetermined protocol via the in-vehicle network NW. The in-vehicle network NW is, for example, a CAN (Controller Area Network) or a LIN (Local Interconnect Network).

The portable device 11 and the vehicle-side device 12 have a wireless communication function for performing wireless communication with each other as described above. The vehicle-side device 12 obtains information related to wireless communication with the portable device 11. For example, the vehicle-side device 12 acquires information on the reception level of the radio wave signal and a position. Based on this information, the vehicle-side device 12 detects whether the occupant H carrying the portable device 11 is located in a predetermined area, for example, at a position closer towards the vehicle than a first area line E1. That is, the distance to the portable device 11 can be calculated according to the reception level of the radio wave signal. As will be described later, from the relationship with the installation position of an antenna, it is possible to detect the direction in which the portable device 11 exists with respect to the vehicle. In addition, the vehicle-side device 12 is configured to output, to the in-vehicle network NW, information related to the positional information about the portable device and the direction toward the portable device obtained in this manner, that is, information on the present position.

The actual functions and operations of the keyless entry will now be described with reference to FIG. 3. In FIG. 3, the occupant H carrying the portable device 11 is shown at its position in the shape of a triangle. In the drawing, a reference symbol D1 denotes a distance (range) to the first area line E1 within which the reception level of the radio wave signal is equal to or greater than a predetermined value, and a range in a circle with a radius D1 centered on the vehicle 10 (vehicle-side device 12) is defined as the first area line E1. In addition, a reference symbol D2 relates, in the same manner as in the case of E1, to a second area line E2 in which the reception level of the radio wave signal is equal to or greater than a second predetermined value and lower than the previously mentioned predetermined value.

First, the occupant H carrying the electronic key, which is the portable device 11, moves to a position at a predetermined distance. At this time, the vehicle-side receiver 12*b* of the vehicle-side device 12 receives the radio wave signal generated by the portable device 11 carried by the occupant. The door lock control unit 12*e* determines whether or not the reception level of the received radio wave signal is equal to or higher than a preset first reference value. The door lock control unit 12*e* is configured to, if it has been confirmed that the reception level is equal to or higher than the first reference value, output a control signal to the door lock mechanism 13 so as to unlock the door lock mechanism 13 that has locked the door 10*a*. That is, as shown in FIG. 3, the occupant H carrying the portable device 11 approaches the vehicle 10 in the door locked state, and enters the inner side (in the unlocking area) of the first area line E1 which is a range with a distance shorter than the predetermined distance D1 within which the reception level of the radio wave signal from the portable device 11 is equal to or greater than the first reference value, and thereby the door 10*a* is automatically shifted to the unlocked state.

The door lock control unit 12*e* is configured to output a control signal for locking the door lock mechanism 13, which is in an unlocked state, to the door lock mechanism 13 if it has been confirmed that the reception level of the radio wave signal from the portable device 11 is equal to or less than the second reference value, which is set to a value smaller than the first reference value, or if it has been confirmed that the radio wave signal has not been received for a predetermined period of time.

It should be noted that, one of the conditions for switching between the locked state and the unlocked state includes an event in which the radio communication between the vehicle-side transmitter 12*a* and the portable device receiver 11*b* has succeeded and authenticated communication has been achieved.

With the above-described configuration, when the occupant H, after getting out of the vehicle 10, moves while carrying the portable device 11 and enters the locking area outside the area partitioned by the second area line E2, which is larger than the first area line E1 (more distant than D1), the reception level of the radio wave signal becomes equal to or lower than the second reference value. At that time, or when the state in which the radio wave signal is not received continues for a predetermined time, the door automatically shifts to the locked state.

Further, the door lock control unit 12*e* is configured to, when the button 11*e* for transmitting the unlock signal of the portable device 11 is operated in the range of the second area line E2 or the range of the first area line E1, output a control signal for setting the door lock mechanism 13 in the locked state to the unlocked state. On the other hand, the door lock control unit 12*e* is configured to, when the button 11*f* for transmitting the lock signal is operated, output a control signal for setting the door lock mechanism 13 in the unlocked state to the locked state regardless of the position of the occupant H carrying the portable device 11.

The distance detecting unit 12*f* detects the position of the portable device 11 from the reception level of the radio wave signal from the portable device 11 received by the vehicle-side receiver 12*b*. The reception level of the radio wave signal is related to the distance between a transmission source and the reception antenna. Based on this relationship, the vehicle-side receiver 12*b* includes a plurality of receiving antennas disposed at a plurality of locations. For example, receiving antennas may be provided in respective seats such as a driver's seat, a passenger's seat, a rear right seat, a rear left seat, and the like. For example, one of the reception antennas may be installed on a driver's seat side dashboard, and the distance to the portable device 11, which is the transmission source, can be calculated from the reception level of a signal received by the installed reception antenna. When the portable device 11 is in the vehicle, it is also possible to detect which seat the portable device 11 is located in from the calculated distance between each receiving antenna and the portable device 11. When the portable device 11 is outside the vehicle, the relationships between each antenna position and the respective reception levels can be compared to detect the direction in which the portable device 11 exists with respect to the vehicle 10.

In the presently disclosed subject matter, the keyless entry system is not limited to the above-described example, and a well-known keyless entry system can be used. For example, an autolock control device (see Japanese Patent Application Laid-Open No. 2003-269023) may be used. Here, the autolock control device automatically locks a door when an occupant carrying a portable device using LF wave communication or UHF communication having a relatively short communication-enabled distance (usually 1 to 2 m) moves away from the vehicle 10 to a distance at which short-range LF communication is not established or a distance at which medium-long-range UHF communication is not established. When such a system is adopted, a control operation for unlocking the vehicle may be performed on the condition that the occupant enters an LF communication-enabled area and two-way communication with the vehicle 10 is established. Furthermore, for example, the system may be configured such that antennas that perform short-range LF communication are disposed at a plurality of locations such as a door knob, a trunk, and a vehicle interior, and a distance detecting unit 12*f* is configured to detect which antenna is closest to the position at which the portable device is present on the basis of the communication state with each antenna. This system can be configured to calculate the distance to the portable device 11.

Next, the lamp group 2 which is a lighting device of the vehicle 10 will be described.

Figure 4:
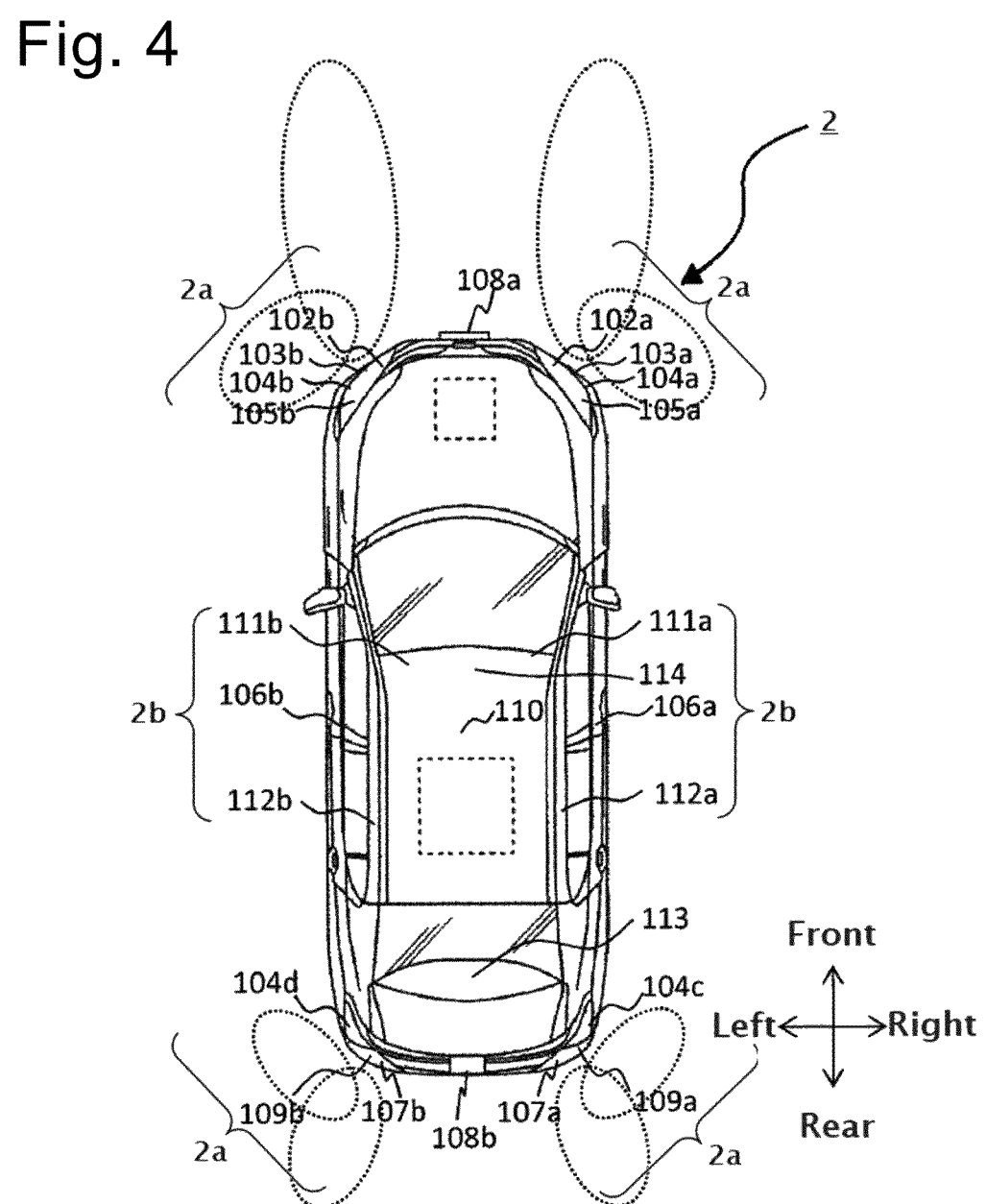
FIG. 4 is a top view for describing a lamp group 2 provided in a vehicle 10.

FIG. 4 is a top view for describing the lamp group 2 provided in the vehicle 10. The vehicle 10 is provided with the lamp group 2 including a plurality of lamps having different functions. That is, the lamp group 2 (vehicle lamp group) includes an exterior lamp group 2*a* and an interior lamp group 2*b*. The exterior lamp group 2*a* includes a plurality of lamps for illuminating the outside of the vehicle 10, for example, lamps disposed in a front part of the vehicle and lamps disposed in a rear part of the vehicle. The interior lamp group 2*b* includes a plurality of lamps for illuminating the inside of the vehicle and includes at least a room lamp and an ambient lamp.

Specifically, as shown in FIG. 4, the exterior lamp group 2*a* for illuminating the outside of the vehicle includes respective illumination lamps corresponding to various functions. Examples thereof include a right headlamp 102*a*, a left headlamp 102*b*, a right fog lamp 103*a*, a left fog lamp 103*b*, a right front turn-signal lamp 104*a*, a left front turn-signal lamp 104*b*, a right rear turn-signal lamp 104*c*, a left rear turn-signal lamp 104*d*, a right cornering lamp 105*a*, a left cornering lamp 105*b*, a right entry lamp 106*a*, a left entry lamp 106*b*, a right rear lamp 107*a*, a left rear lamp 107*b*, a front license lamp 108*a*, a rear license lamp 108*b*, a right rear tail lamp 109*a*, and a left rear tail lamp 109*b*. In the drawings, a range surrounded by a dotted line is illustrated in a simplified manner as a representative example of a region illuminated by a headlamp, a turn-signal lamp, or a tail lamp for ease of understanding.

Generally, the illumination lamps included in an exterior headlamp group 2*a* has the following functions. The right headlamp 102*a* and the left headlamp 102*b* are illumination lamps that illuminate the forward direction of travel. The right fog lamp 103*a* and the left fog lamp 103*b* are provided to improve the visibility for a driver, and function as supplementary illumination lamps for the respective headlamps 102*a* and 102*b*. The right front turn-signal lamp 104*a*, the left front turn-signal lamp 104*b*, the right rear turn-signal lamp 104*c*, and the left rear turn-signal lamp 104*d* are direction indicators that indicate, to front and rear vehicles, pedestrians, and the like, a right or left direction in which the vehicle 10 turns. The right cornering lamp 105*a* and the left cornering lamp 105*b* are supplementary illumination lamps that emit light in right and left turn directions in conjunction with the turn-signal lamps 104*a* and 104*b*. The right entry lamp 106*a* and the left entry lamp 106*b* are illumination lamps provided at indoor lower portions of the respective doors on the driver's seat side and on the passenger's seat side to help the occupant ascend and descend easily, and these lamps are configured to illuminate the vicinity of the foot of the occupant, for example, in accordance with opening and closing of the door. The right rear lamp 107*a* and the left rear lamp 107*b* are illumination lamps for notifying a rear vehicle or the like of the rear movement of the vehicle. The front license lamp 108*a* and the rear license lamp 108*b* are illumination lamps that illuminate a vehicle signboard (license plate) attached to the front and rear portions of the vehicle 10. The right rear tail lamp 109*a* and the left rear tail lamp 109*b* are illumination lamps that are turned on during nighttime traveling to indicate, to a rear vehicle, the vehicle width and the like of the vehicle 10.

On the other hand, the interior lamp group 2*b* for illuminating the inside of the vehicle includes various illumination lamps corresponding to various functions. Examples thereof include a room lamp (interior lamp) 110 for illuminating the center of the vehicle interior, a right map lamp 111*a* and a left map lamp 111*b* for illuminating the front seats, a right rear side lamp 112*a* and a left rear side lamp 112*b* provided on the side ceiling of the seat, luggage lamps 113 provided on the rear hatch and the trunk part, and ambient lamps 104. The ambient lamps 104 are provided at an upper portion or a lower portion of the front panel or the door to illuminate the vicinity of the door, and the side lamps may also be referred to as an ambient lamp in some cases.

Each of the lamps included in the exterior lamp group 2*a* and the interior lamp group 2*b* constituting the vehicle lamp group 2 is controlled so that its light source is turned on or off (may be abbreviated as "on/off" in this specification) according to the function of each lamp and based on a switch provided in the driver's seat or a sensor signal such as an illuminance sensor or a braking operation provided in the vehicle 10.

Figure 5:
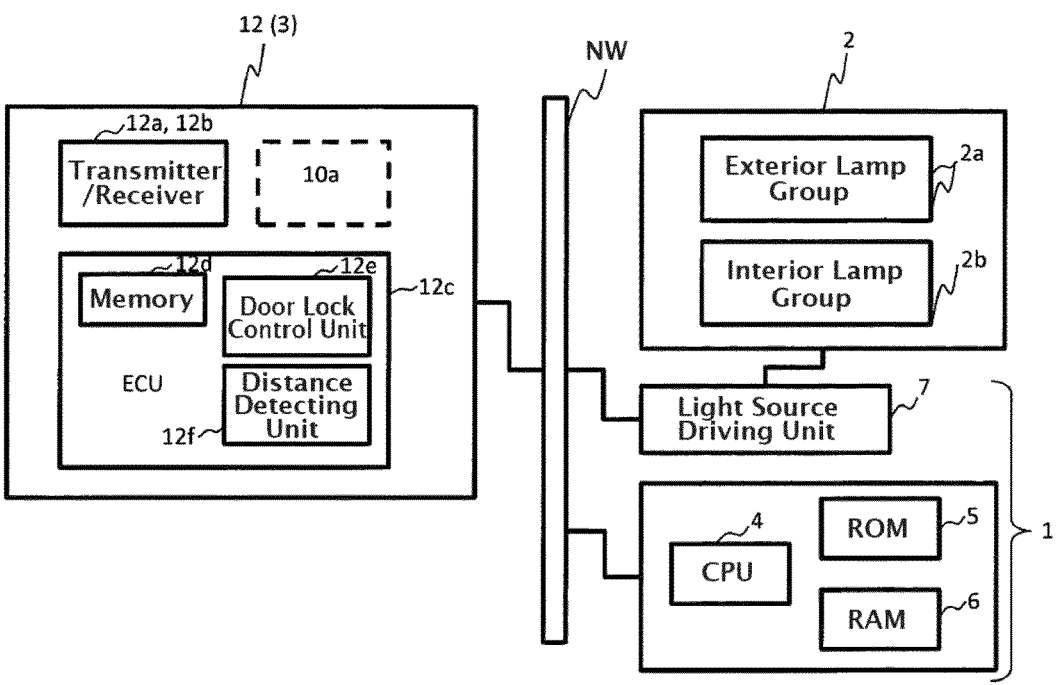
FIG. 5 is a schematic diagram illustrating a configuration example of the vehicle-side device 12 and the lamp group 2 that is a lighting device.

FIG. 5 is a schematic diagram illustrating a configuration example of the vehicle-side device 12 and the lamp group 2 that is a lighting device. In the present embodiment, the lamps of the exterior lamp group 2*a* and the interior lamp group 2*b* are connected to a battery and a light source driver that includes a driving unit 7 provided in the vehicle main body via connectors for the respective lamps.

The light source driving unit 7 is connected to the in-vehicle network NW. The light source driving unit 7 may be individually provided in a manner corresponding to each lamp, or may be provided collectively for a plurality of lamps. For example, if the light source driving units for the left headlamp 102*b*, the left fog lamp 103*b*, the left front turn-signal lamp 104*b*, and the left cornering lamp 105*b*, which are provided in the left front portion, are collectively disposed in the housing of the headlamp, the driving units for the plurality of lamps can be grouped together, thereby achieving a compact structure. The light source driving unit 7 may include an input voltage detector or the like. The light source driving unit 7 has a function of being controlled based on output signals (control signal) from the lighting control device 1.

Figure 6:
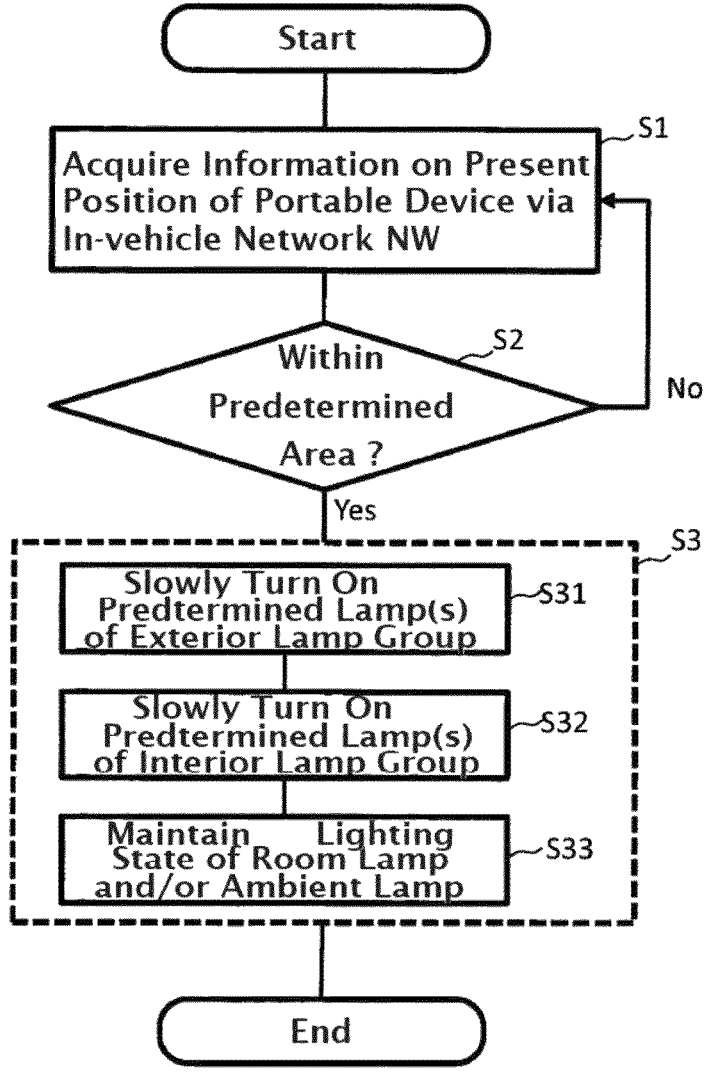
FIG. 6 is a flowchart for describing lighting control of the lamp group 2 according to the first embodiment.

The lighting control device 1 is mainly composed of a microcomputer that includes electronic circuits such as a CPU 4, a ROM 5, a RAM 6, an input/output unit (I/O), an A/D circuit (not shown), and the like. The lighting control device 1 may be configured to include the light source driving unit 7 as a functional block. The ROM 5 stores, for example, a lighting control program for controlling the lighting of each lamp of the lamp group 2 as illustrated in the flowchart of FIG. 6 and subsequent drawings. The CPU 4 executes various processes using the lighting control programs stored in the ROM 5 with the RAM 6 that serves as a work area. With this configuration, control signals and the like for driving the light source driving unit 7 are generated and output. The lighting control device 1, which corresponds to the lighting control unit or controller according to the presently disclosed subject matter, outputs control signals to the light source driving unit 7 via the in-vehicle network NW. The individual lamps of the lamp group 2 may also be manually turned on by a separate switch provided in the driver's seat by means of the lighting control device 1.

In the present embodiment, the lighting control device 1 can perform lighting control on the lamps of both the exterior lamp group 2*a* and the interior lamp group 2*b* so that a plurality of lamps are turned on at predetermined timings in an arbitrary lighting pattern among a plurality of predetermined lighting patterns, which will be described later. For example, as illustrated in FIG. 6, when the occupant H carrying the portable device 11 approaches the vehicle 10, the vehicle light system 100 of the presently disclosed subject matter achieves illumination that produces an ambience in which the vehicle seems to welcome the occupant H. As a result, the occupant H can recognize the appeal of the vehicle design through the illumination effect produced by the lighting on/off control of the plurality of lamps mounted on the vehicle 10. In addition, by having the occupant H recognize the appeal of the vehicle design anew, it becomes possible to enhance attachment of the occupant H to the vehicle.

It is possible to use a light emitting diode (LED: Light Emitting Diode) as a light source of each lamp to be controlled by the lighting control device 1. By uniformly using LEDs as the light sources to be controlled for lighting, it is possible to control the responsiveness to the driving current in a uniform manner as compared with the case where incandescent lamps and LEDs are mixed as the types of the light sources. Further, the response speed, when LEDS are used, can be made faster than in the case of using conventional incandescent lamps. In addition, since the light source driving control can be achieved by taking advantage of LED properties, the lighting control device can be simplified, and the control IC and the driving power supply can be shared. Furthermore, by uniformly using the control device, it is expected that intensive lighting control becomes possible and setting up becomes easy. For example, when the light intensity of an LED that serves as the light source is controlled by the magnitude of the current, an LED driving circuit drives the light source 2 with a current having a magnitude corresponding to a desired light intensity. For example, if an LED driving circuit capable of PWM (Pulse Width Modulation) controlling the light sources is adopted, the light sources are driven by a variable pulse-width control signal indicating a current corresponding to a desired light intensity. In particular, when the sequential lighting control (sequential lighting) described later is performed, it is possible that the response speed be uniform for ease of control. Therefore, it is possible to uniformly use LEDs as the type of light source to be controlled, with the LED having a faster response speed than an incandescent light bulb.

First Embodiment

Next, the lighting control of the lamp group 2 of the present embodiment will be described with reference to FIG. 6. FIG. 6 is a flowchart for describing lighting control of the lamp group 2 according to the first embodiment. In the following sections, the term "lighting" is used for both the control on a lamp and the control on a light source. The term "lighting" encompasses lighting at the maximum light intensity and lighting at the minimum light intensity. In particular, in the present description, the term "slow(ly) lighting (turning on)" refers to lighting in which a lamp to be turned on is tuned on while increasing light intensity from a state in which the lamp is turned off to a target predetermined light intensity continuously or stepwise over time via a state in which the lamp is turned on at a minimum light intensity or an initial predetermined light intensity. In addition, in the case where the lamp to be turned on is a lamp using a plurality of light sources, a control is also included in which the number of light sources to be turned on among the plurality of light sources increases continuously or stepwise with time. Similarly, the phrase "slow(ly) turning off" refers to a decrease in light intensity from a lighting state at a maximum light intensity or a predetermined light intensity to a turning-off state over time continuously or stepwise.

As described above, the distance detecting unit 12*f* of the keyless entry device 3 detects the position of the portable device 11 from the reception level of the radio wave signal that comes from the portable device 11 and is received by the vehicle-side receiver 12*b*. As shown in FIG. 3, the occupant H carrying the portable device 11 approaches the vehicle 10 in the door locked state, and enters the inner side (in the unlocking area) of the first area line E1 in which the reception level of the radio wave signal is equal to or greater than the first reference value, and as a result, the lighting control device 1 automatically shifts the door 10*a* to the unlocked state.

At this time, the in-vehicle network NW is provided with information directly or indirectly indicating that the occupant has entered the inner side (in the unlocking area) of the first area line E1 in which the reception level of the radio wave signal is equal to or greater than the first reference value, for example, information on the reception level or information on the distance. Furthermore, direction-related information derived from the plurality of pieces of information on respective antennas and their reception levels is also provided.

In the present embodiment, the signal of the keyless entry device 3 is used. Specifically, first, the lighting control device 1 performs a step of receiving, by the receiver 12*b* of the vehicle-side device 12, the information on the distance and direction to the portable device 11, that is, the information on the present position of the portable device 11, and acquiring the information through the in-vehicle network NW (S1).

Next, the lighting control device 1 performs a step of determining whether or not the distance to the occupant H carrying the portable device 11 is within a predetermined area outside the vehicle (S2). Here, the predetermined area is an inner side (an unlocking area within the range D1) of the first area line E1 illustrated in FIG. 3. If it is determined that the occupant is not within the predetermined area E1, that is, if a "No" is the determined result, the process returns to the step S1 after a predetermined period of time elapsed, and the step of determining whether or not the distance to the occupant H is within the predetermined area E1 is repeatedly performed. This process makes it possible to know when the distance between the portable device 11 and the vehicle-side device 12 has changed from outside the predetermined range to within the predetermined range. Note that when the lamp group 2 is to be turned on in a stage earlier than the transition from the locked state to the unlocked state of the door 10*a* in the control, the predetermined area may be set to the second area E2 that is further outward than the first area E1 illustrated in FIG. 3.

Next, the lighting control device 1 performs a step of turning on, at a predetermined timing, a predetermined lamp among the plurality of lamps of the lamp group 2 (S3). In the example illustrated in FIG. 6, the lighting timing of the step S3 includes three steps, S31, S32, and S33, performed in this order.

S31 includes slowly turning on (gradually increasing the light intensity from the off-state) a lamp closest to the occupant H, for example, the right front turn-signal lamp 104a among the exterior lamp group 2a. S32 includes slowly turning on (gradually increasing the light intensity from the off-state), for example, the room lamp 110 among the interior lamp group 2b. S33 includes turning on the room lamp 110 and the ambient lamp 104 that are provided in the interior of the vehicle and are among the interior lamp group 2b. When the door 10a is opened or a certain period of time has elapsed, the lamp control program illustrated in FIG. 6 is ended.

As described above, the lighting control device 1 sequentially performs the three steps as the step S3 of turning on, at predetermined timings, the predetermined lamps among the plurality of lamps of the lamp group 2. That is, the above-described step S31 corresponds to a process of generating and outputting (A) a first control signal that gradually increases the light intensity of light sources of predetermined lamps among the plurality of lamps of the exterior lamp group from an off-state to turn on the light source. Further, the above-mentioned steps S32 and S33 correspond to a process of generating and outputting the second control signal for turning on a light source of at least either the room lamp or ambient lamp among the plurality of lamps of the interior lamp group while continuously maintaining a predetermined light intensity.

In the above-described step S31, in place of (A) generating a control signal that slowly turns on (gradually increasing the light intensity from the off-state) the lamp closest to the occupant H, for example, the right front turn-signal lamp 104a among the exterior lamp group 2a, the left and right headlamps 102a and 102b (functioning as, for example, a low beam lamp) and the left and right tail lamps 109a and 109b among the exterior lamp group may be simultaneously turned on at a predetermined light intensity and then gradually lowered in light intensity. Such a lighting control corresponds to a process of generating and outputting (B) a different first control signal that turns on light sources of predetermined lamps among the plurality of lamps of the exterior lamp group from the off-state to a lighting state at a predetermined light intensity and that afterwards gradually decreases the light intensity in the presently disclosed subject matter.

As is obvious from the above-mentioned description, in the first embodiment, the present position of the occupant H is detected by using the radio communication function between the portable device 11 and the vehicle-side device 12. If it is determined that the detected position is within the predetermined area around the vehicle owned by oneself, the lighting control device 1 controls the lighting of the exterior lamp group 2a and the interior lamp group 2b in a manner where they cooperate with each other. As a result, the nighttime visibility of the vehicle 10 as it is approached by the occupant H can be improved. In addition, the occupant H can easily pinpoint the parking position of the vehicle owned by oneself 10. In addition, by controlling the timings of turning on and off the lamps, the exterior lamp group 2a and the interior lamp group 2b can be controlled to be turned on in cooperation with each other. With these lighting-controlled vehicle lights, it is possible to achieve an effect where the vehicle, as a whole, appears as if it is expressing thoughts of being ready to welcome the occupant H. Furthermore, since the keyless entry device 3 and the in-vehicle network NW, which are conventionally used, are adopted, the vehicle light system can be easily and inexpensively configured.

Second Embodiment

This second embodiment is different from the first embodiment in that, the vehicle light system is controlled in a manner where the lamps to be turned on and the lighting timings are different in the step (S3), which is indicated by a broken line in FIG. 6 and consists of turning on, at a predetermined timing, a predetermined lamp among a plurality of lamps of the lamp group 2. Since the other configurations are the same as those of the first embodiment, the same reference numerals are given to the same components as those of the first embodiment and also to processing steps that perform the same functions as those of the first embodiment, and descriptions thereof will be omitted.

FIG. 7 includes diagrams for describing lighting states of the lamps according to the second embodiment, wherein FIG. 7A is a flow diagram showing control, and FIG. 7B includes a plurality of schematic plan views showing positions of lamps to be turned on corresponding to the flow. Furthermore, in FIG. 7B, areas filled with a stripe pattern indicate a schematic range that is illuminated by respective turned-on lamps. The reference numeral indicates the steps in the flow diagram of FIG. 7A, and each of the diagrams in FIG. 7B indicates a lighting state when a corresponding lighting action is performed. In FIG. 7A, the steps after the step S2 in FIG. 6 are described.

In the second embodiment, the content of the step (S3), which is indicated by the broken line in FIG. 6 and consists of turning on, at the predetermined timings, the predetermined lamps among the plurality of lamps of the lamp group 2, is different from that of the first embodiment. In other words, the subroutine indicating the content of the step S3 is different. In the first embodiment, this subroutine is a subroutine that turns on the predetermined lamps in the order of the three steps, S31, S32, and S33. In the second embodiment, as shown in the flow diagram of FIG. 7A, the subroutine of the step S3 is different in that the predetermined lamps are sequentially turned on in five steps of S32a, S32b, S32c, S32d, and S32e.

When a "Yes" is the determined result in the above-described step S2, that is, if it is determined that the distance to the occupant H carrying the portable device 11 is within the predetermined area E1 outside the vehicle, the headlight is first turned on slowly (the light intensity is gradually increased from the off-state). More specifically, a step (S32a) of slowly turning on (gradually increasing the light intensity thereof from the off-state) the headlamps 102a and 102b (for example, a lamp for low-beam light distribution, a day-time running lamp (DRL), or the like provided in the headlamp), among the exterior lamp group 2a, is performed. Next, a step (S32b) of slowly turning on (gradually increasing the light intensity thereof from the off-state) the ambient lamp 104 for illuminating the instrument panel among the ambient lamps 104 in the interior lamp group 2b is performed. At this time, since the lighting state at the step 32a is maintained, the lighting state of the lamps is shifted from the non-lighting state of S2 in FIG. 7B to the lighting state of illuminating the front of the vehicle in S32a, and the state of illuminating the instrument panel in the front area of the vehicle interior and in front of the vehicle of S32b, so that the lighting range is expanded sequentially.

When a DRL is provided in the headlamp, the DRL can be similarly controlled to be turned on in this embodiment as described above. Therefore, when the headlamp is composed of a plurality of lamps such as a low-beam light distribution lamp, a high-beam light distribution lamp, and a DRL, the presently disclosed subject matter encompasses an aspect in which any one or the entirety of the lamps are controlled to be turned on as the headlamp. The presently disclosed subject matter also encompasses aspects in which lighting control similar to the above-mentioned lighting control is performed on other types of lamps that are constituted by a plurality of lamps or light sources.

Next, a step (S32c) of slowly turning on (gradually increasing the light intensity thereof from the off-state) the ambient lamp 104 provided in the inside of the door of the vehicle is performed. Next, a step (S32d) of slowly turning on (gradually increasing the light intensity thereof from the off-state) the left and right rear tail lamps 109a and 109b among the exterior lamp group 2a is performed. When the process proceeds to this step 32d, the front and rear corners of the vehicle 10 and the vicinities of the door and the windshield in the vehicle are brightly illuminated as indicated by reference symbols S32c and S32d in FIG. 7B. This illumination allows the occupant H to recognize the vehicle design, in particular, the signature of his/her vehicle owned by oneself.

Next, a step (S32e) of turning on the room lamp 110 among the interior lamp group 2b is performed. When the process proceeds to this step 32e, as indicated by the reference symbol S32e in FIG. 7B, the outer appearance shape of the vehicle 10 can be recognized by the turned-on lamps at the front and rear corners of the vehicle 10, and the inside of the vehicle is illuminated brighter than in the step 32d. Accordingly, by having the occupant H recognize the signature of the vehicle, the appeal of the vehicle design can be recognized anew. In the case of a vehicle not equipped with an ambient lamp, the step of turning on the ambient lamp is omitted. Instead of the ambient lamp 104 for illuminating the instrument panel, map lamps 111a and 111b for illuminating the front seat may be used.

With these steps S32a to S32e, the number of lamps that have been slowly turned on is sequentially increased to illuminate the vehicles 10 brighter. As a result, the occupant H can initiate turning on the lamps in order from the headlamp symbolizing the face of the vehicle 10 to the rear-side lamps, and so an image in which the vehicle wakes up can be produced. Finally, by turning on the room lamp 110, it is possible to achieve an effect where the vehicle appears as if it is expressing thoughts of being ready to welcome the occupant H. In addition, when the occupant H himself/herself has purchased a vehicle, he/she has generally looked at the vehicle just at and around the time of purchasing the vehicle, and after the purchase, the opportunities to view the signature of the vehicle owned by oneself decrease. However, the vehicle light system 100 that performs the lighting control of the present embodiment guides the line of sight to the signature of the vehicle owned by oneself and that has had its opportunities of being viewed reduced. Therefore, the occupant H can recognize the appeal of the vehicle design anew, and the effect can be expected that the attachment to the vehicle owned by oneself is enhanced, whereby the brand image is improved.

Third Embodiment

Similarly to the second embodiment, the third embodiment is also different from the first embodiment in that lamps to be turned on and lighting timings are controlled differently in the step (S3), which is indicated by the broken line in FIG. 6 and consists of turning on a predetermined lamp at a predetermined timing among the plurality of lamps of the lamp group 2. Since the other configurations are the same as those of the first embodiment, the same reference numerals are given to the same components as those of the first embodiment and also to processing steps that perform the same functions as those of the first embodiment, and descriptions thereof will be omitted.

FIG. 8 includes diagrams for describing lighting states of lamps according to the third embodiment, wherein FIG. 8A is a flow diagram showing control, and FIG. 8B includes a plurality of schematic plan views showing positions of lamps to be turned on corresponding to the flow. Here, the drawings describe the flow of the subroutine showing the contents of the steps and the lighting states of the lamps corresponding thereto, as in FIG. 7B. Note that FIG. 8A also shows the steps after the step S2 in FIG. 6.

When a "Yes" is the determined result in the above-described step S2, that is, if it is determined that the distance to the occupant H carrying the portable device 11 is within the predetermined area E1 outside the vehicle, a step (S33a1) of blinking the vehicle front turn-signal lamps 104a and 104b among the exterior lamp group 2a, and at the same time of or immediately after blinking, slowly turning on (gradually increasing the light intensity from the off-state) the headlamps 102a and 102b, an example of such headlamps being the daytime running lamps (DRL) is first performed. Then, a step (S33a2) of blinking the turn-signal lamps 104c and 104c at the rear of the vehicle, and at the same time of or immediately after blinking, slowly turning on the tail lamps 109a and 109b is performed. The order of the steps S33a1 and S33a2 is not limited to this order, and may be reversed. At this time, the turn-signal lamps 104c and 104c are illuminated with amber light emission, and the color thereof is mixed with the white color of the position lamp or the red color of the tail lamps 109a and 109b included in the vehicle to illuminate the road surface with the mixed light. This illumination allows the contour of the vehicle to emerge while also causing a change in color.

Next, a step (S33a3) of slowly turning on the room lamp 110 among the interior lamp group 2b is performed, and then a step (S33a4) of slowly turning on the ambient lamp 104 that illuminates the vehicle interior is performed. When the vehicle 10 is not equipped with an ambient lamp, steps of lighting these lamps may be omitted, or the map lamps 111a and 111b may be used instead. The subroutines composed of the steps S33a1, S33a2, S33a3 and S33a4 are collectively represented by the step S33a, and are represented as S33a in FIG. 8B, which indicate the lighting state after the completion of all of the steps S33a1 to S33a4. As illustrated in FIG. 8B, it is possible to realize a dramatic illumination effect of causing the contour of the vehicle to emerge.

Next, a step (S33b1) of turning on the headlamps 102a and 102b, examples of such headlamps being lamps for low-beam light distribution, among the exterior lamp group 2a is performed. Then, a step (S33b2) of turning on the left and right rear tail lamps 109a and 109b is performed. Next, a step (S33b3) of turning on the room lamp 110 in the interior lamp group 2b is performed. Next, a step (S33b4) of turning on the ambient lamp 104 provided on the inside of the door or the like is performed. The subroutines composed of the steps S33b1, S33b2, S33b3 and S33b4 are collectively represented by the step S33b, and are represented as S33b in FIG. 8B, which indicates the lighting state after the completion of all of the steps S33b1 to S33b4. As illustrated in FIG. 8B, after illuminating for a dramatic effect of causing the contour of the vehicle to emerge in the step S33a, further widening the illumination area can further enhance the dramatic illumination effect of causing the contour of the vehicle to emerge.

With these steps S33*a* (S33*a*1 to S33*a*4) and S33*b* (S33*b*1 to S33*b*4), the number of lamps that have been turned on slowly is increased in order to illuminate the vehicles 10 brighter. As a result, the occupant H is allowed to recognize that the contour of the vehicle 10 emerges from the darkness, and the vehicle form can be emphasized and shown in an appealing manner. Further, it is possible to achieve an effect where the vehicle appears as if it awakes and is expressing thoughts of being ready to welcome the occupant H. In addition, when the occupant H himself/herself has purchased a vehicle, he/she has, in general, only looked at the vehicle at and around the time of purchasing the vehicle, but after the purchase, the opportunities to view the signature of the vehicle owned by oneself decrease. However, the vehicle light system 100 that performs the lighting control of the present embodiment guides the line of sight to the signature of the vehicle that is owned by oneself and has a reduced chance of being viewed. Therefore, the occupant H can recognize the appeal of the vehicle design anew, and an effect can be expected where the attachment of the owner to their vehicle is enhanced and the brand image is thus improved.

Fourth Embodiment

Similarly to the second embodiment, the fourth embodiment is also different from the first embodiment in that lamps to be turned on and lighting timings are controlled differently in the step (S3), which is indicated by the broken line in FIG. 6 and consists of turning on a predetermined lamp at a predetermined timing among the plurality of lamps of the lamp group 2. Since the other configurations are the same as those of the first embodiment, the same reference numerals are given to the same components as those of the first embodiment and also to processing steps that perform the same functions as those of the first embodiment, and descriptions thereof will be omitted.

Figures 9A, 9B:
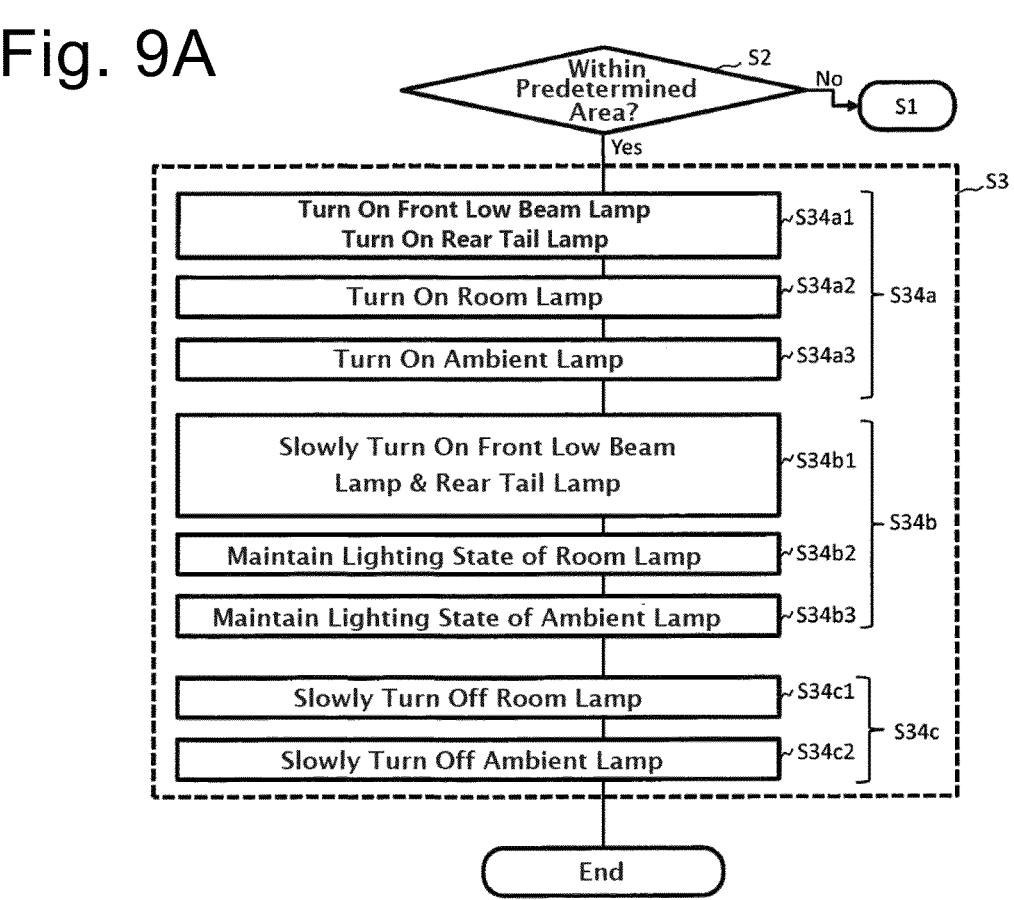
FIG. 9A is a flow diagram showing control, and FIG. 9B includes a plurality of schematic plan views showing positions lamps to be turned on corresponding to the flow.

FIG. 9 includes diagrams for describing lighting states of the lamps according to the fourth embodiment, wherein FIG. 9A is a flow diagram showing control, and FIG. 9B includes schematic plan views that shows positions of lamps to be turned on corresponding to the flow. Here, the drawings describe the flow of the subroutine showing the contents of the step S3 and the lighting states of the lamps corresponding thereto, as in FIG. 7. Note that FIG. 9A also shows the steps after the step S2 in FIG. 6.

When a "Yes" is the determined result in the above-described step S2, that is, if it is determined that the distance to the occupant H carrying the portable device 11 is within the predetermined area E1 outside the vehicle, a step (S34*a*1) of turning on the headlamps 102*a* and 102*b* (functioning as a low beam lamp) and/or the position lamps in the front portion of the vehicle and the tail lamps 109*a* and 109*b* in the rear portion of the vehicle among the exterior lamp group 2*a* is first performed. Next, a step (S34*a*2) of turning on the room lamp 110 among the interior lamp group 2*b* is performed, and a step (S34*a*23) of turning on the ambient lamp 104 is performed. Note that the lighting order of the steps S34*a*1 to S34*a*3 is not limited to this order. Alternatively, three steps or two steps among these steps may be performed simultaneously. The subroutines composed of the steps S34*a*1, S34*a*2 and S34*a*3 are collectively represented by the step S34*a*, and are represented as S34*a*1 in FIG. 9B which indicates the lighting state after the completion of all of the steps S34*a*1 to S34*a*3. As illustrated in FIG. 9B, by the step S34*a* of turning on, starting from an initial non-lighting state in the step 2, both the interior and exterior lamp groups

2, it is possible to realize a dramatic illumination effect of causing the entire vehicle to emerge at night.

Next, a step S34*b* of slowly turning off part of the lamps that have been turned on in the step S34*a* is performed. The subroutine (S34*b*1) of the step S34*b* performs a step of first slowly turning off the headlamps 102*a* and 102*b* (functioning as a low beam lamp) and/or the position lamps, which have been in the lighting state, in the front portion of the vehicle, and also slowly turning off the tail lamps 109*a* and 109*b* in the rear portion of the vehicle. Then, a step (S34*b*2) of maintaining the lighting state of the room lamp 110 among the interior lamp group 2*b* and a step (S34*b*3) of maintaining the lighting state of the ambient lamp 104 are performed. The steps 34*b*2 and S34*b*3 are steps of maintaining the lighting states of the interior lamps that were turned on in the step 34*b*1 and continued to stay tuned on during the step S34*b*1. The subroutines composed of the steps S34*b*1, S34*b*2 and S34*b*3 are collectively represented by the step S34*b* and are represented as S34*b* in FIG. 9B, which indicate the lighting state in which the lamps of the exterior lamp group are being slowly turned off (gradually decreasing the light intensity). After the entire vehicle is caused to emerge in S34*a*, the exterior lamp group 2*a* can be gradually turned off to achieve the dramatic illumination effect.

Further, it is possible that the subroutine of the step S34*b* inserts, between the step S34*a* and the step S34*b*, a step of confirming that the lighting control device 1 has recognized that the occupant H has become closer to the vehicle 10 relative to the position where the occupant H was recognized as having entered the predetermined area E1 in the step S2, i.e., confirming whether or not the distance from the vehicle 10 to the portable device 11 has decreased over time. This insertion can be beneficial because, by confirming whether or not the occupant His approaching the vehicle 10, it is possible to achieve, by the lighting that is slowly turned off, an impression of the vehicle appearing to express its thoughts of welcoming the occupant H approaching the vehicle 10.

In the following step S34*c*, a process of also slowly turning off the interior lamp group 2*b* that has stayed turned on is performed. Specifically, a process of slowly turning off the exterior lamp group 2*a* in the step S34*b* and also slowly turning off the interior lamp group 2*b* that has stayed turned on, due to the illumination that maintains the lighting state of the interior lamp group 2*b* is performed. The subroutine of the step S34*c* performs a step (S34*c*1) of slowly turning off the room lamp 110 included in the interior lamp group 2*b* that has stayed turned on. Then a step (S34*c*2) of slowly turning off the ambient lamp 104 is performed. The steps S34*c*1 and S34*c*2 may be performed simultaneously or in the reverse order. When the vehicle 10 is not equipped with an ambient lamp, the steps of turning on such an ambient lamp may be omitted, or the map lamps 111*a* and 111*b* may be used instead. The subroutines composed of the steps S34*c*1 and S34*c*2 are collectively represented by the step S34*c* and are represented as S34*b*1 in FIG. 9B, which indicates the lighting state in which the lamps of the interior lamp group 2*b* in S34*b*1 are being slowly turned off. The lamps of the interior lamp group 2*b* remaining in the step S34*c* are gradually turned off, and thus the lamps of the vehicle 10 are sequentially turned off, thereby achieving a dramatic illumination effect.

Further, it is possible that the subroutine of the step S34*c* inserts, between the step S34*b* and the step S34*c*, a step of confirming that the lighting control device 1 has recognized that the occupant H has become closer to the vehicle 10 than the reference position of the occupant H prior to starting the subroutine of the step S34b, i.e. confirming whether or not the distance from the vehicle 10 to the portable device 11 has decreased. This insertion can be beneficial because, by confirming whether or not the occupant H is approaching the vehicle 10 over time, it is possible to achieve, by the lighting that is slowly turned off, an impression of the vehicle appearing to express its thoughts of welcoming the occupant H approaching the vehicle 10.

According to these steps S34a (S34a1 to S34a3), step S34b (S34b1 to S34b3) and step S34c (S34c1 and S34c2), the predetermined lamps among the exterior lamp group 2a and the interior lamp group 2b are simultaneously turned on, and then the predetermined lamps among the exterior lamp group 2a are turned off slowly and sequentially. Then the predetermined lamps among the interior lamp group 2b are also turned off slowly. As a result, the occupant H can recognize the contour and the interior of the vehicle emerging once from the darkness, and the vehicle form can be emphasized and shown in an appealing manner. Furthermore, it is possible to achieve a dramatic effect where the vehicle appears to suddenly awake. Further, when a process of determining whether or not the occupant H has approached the vehicle 10, i.e. whether or not the portable device 11 has approached the vehicle 10 is included in the method, it is possible to achieve a dramatic effect of turning off the lamps slowly as the occupant H gets closer to the vehicle 10.

Fifth Embodiment

Similarly to the second embodiment, the fifth embodiment is also different from the first embodiment in that the lamps to be turned on and lighting timings are controlled differently in the step (S3), indicated by the broken line in FIG. 6, of turning on, at a predetermined timing, a predetermined lamp among the plurality of lamps of the lamp group 2. Since the other configurations are the same as those of the first embodiment, the same reference numerals are given to the same components as those of the first embodiment and also to processing steps that perform the same functions as those of the first embodiment, and descriptions thereof will be omitted.

Figure 10A:
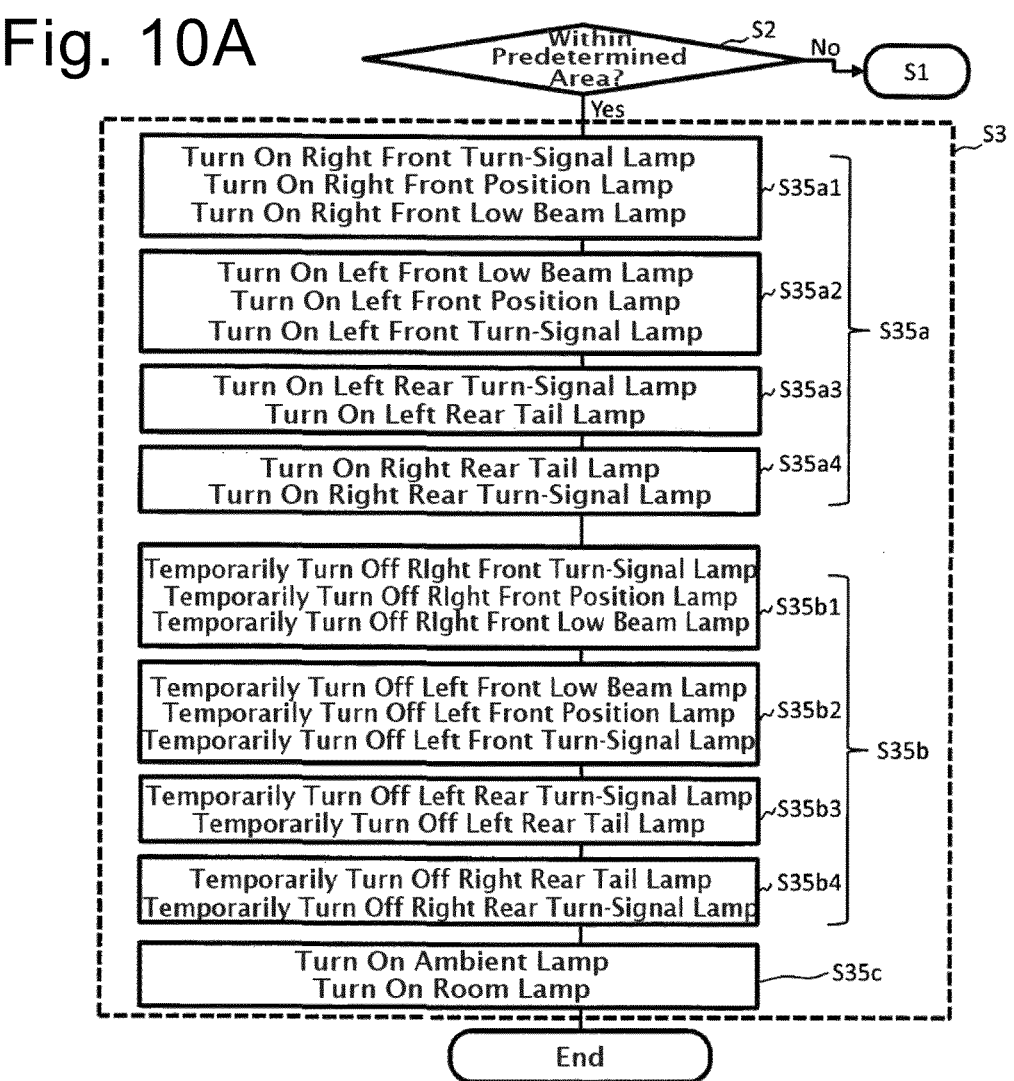
FIG. 10A is a flow diagram showing control, and FIG. 10B includes a plurality of schematic plan views showing positions of lamps to be turned on corresponding to the flow.
Figure 10B:
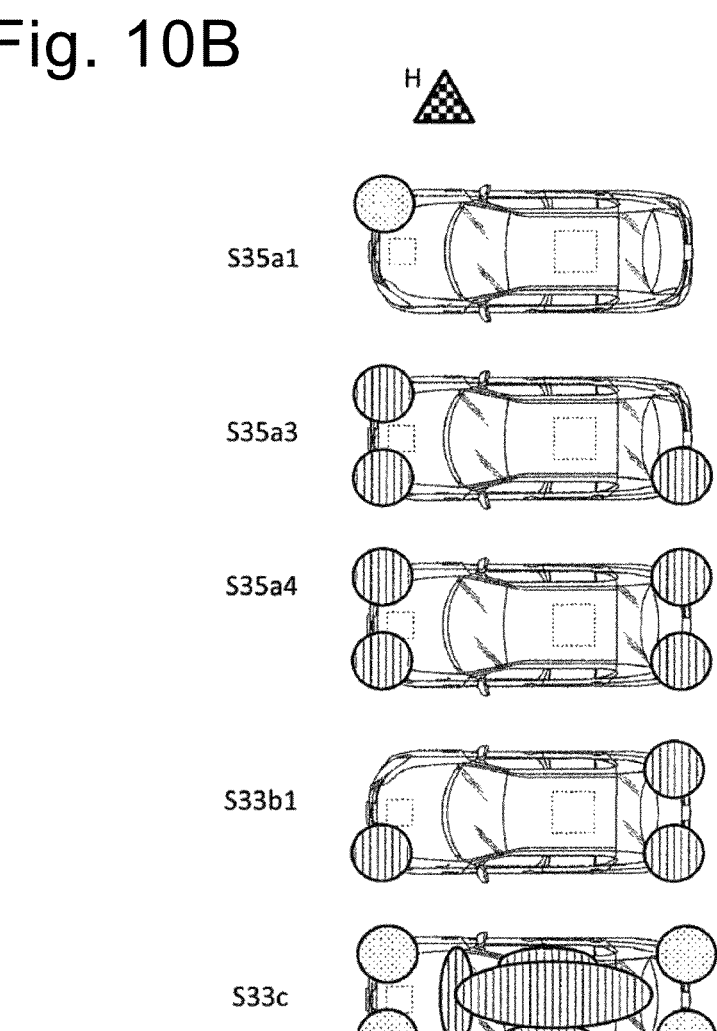

FIG. 10 includes diagrams for describing lighting states of the lamps according to the fifth embodiment, wherein FIG. 10A is a flow diagram showing control, and FIG. 10B includes schematic plan views, which shows positions of lamps to be turned on corresponding to the flow. Here, the drawings describe the flow of the subroutine showing the contents of the step S3 and the lighting states of the lamps corresponding thereto, as in FIG. 7. Note that FIG. 10A also shows the steps after the step S2 in FIG. 6.

When a "Yes" is the determined result in the above-described step S2, that is, if it is determined that the distance to the occupant H carrying the portable device 11 is within the predetermined area E1 outside the vehicle, then, at the same time, the lamp closest to the occupant H is determined. For example, in the example illustrated in FIG. 10B, it is recognized that the occupant H is approaching the vehicle 10 from the right front. As described in the first embodiment, information on the moving direction of the occupant H is available through the in-vehicle network NW.

First, a step (S35a1) where the lighting control device 1 generates and outputs control signals for sequentially turning on the lamps closest to the occupant H among the exterior lamp group 2a, for example, the right front turn-signal lamp 104a, the right front position lamp, and the right front headlamp 102a (functioning as a low beam lamp) is performed. Next, lamps located farther from the occupant H but on the vehicle front side which is the same side as the occupant, are sequentially turned on, i.e. lamps on the vehicle front left side are turned on. Specifically, a step (S35a2) where the lighting control device 1 generates and outputs control signals for sequentially turning on the left front headlamp 102b (functioning as a low beam lamp), the left front position lamp and the left front turn-signal lamp 104b is performed. The lighting control device 1 is made to generate and output control signals such that, depending on whether the position close to the occupant H is the front side or the rear side, lamps among the exterior lamp group 2a are sequentially turned on from the side close to the occupant H toward the far side on the same left/right side.

Next, a step (S35a3) where the lighting control device 1 generates and outputs control signals for sequentially turning on the left rear turn-signal lamp 104d and the left rear tail lamp 109b, which are the exterior lamps farthest from the occupant H, is performed. Next, a step (S35a4) where the lighting control device 1 generates and outputs control signals for sequentially turning on the right rear tail lamp 109a and the right rear turn-signal lamp 104c, i.e. the right rear lamps, which are on the side closer to the occupant H on the rear side of the vehicle.

The sequential lighting refers to what is visually recognized as a dynamic lighting that is sequentially turning on the lamps so as to move the lighting from a side close to the occupant H toward a side far from the occupant H, and is also referred to as sequential lighting. As for the sequential lighting, for example, a control method described in Japanese Patent Application Laid-Open No. 2017-183287 or No. SHO 63-106153, which are patent applications filed by the same applicant as the present application, can be used. By such sequential lighting, the lamps among the exterior lamp group 2a are sequentially turned on starting from the lamps that are located at positions close to the occupant H and going around the vehicle. The subroutines composed of the steps S35a1, S35a2, S35a3 and S35a4 are collectively represented by the step S35a, and are represented as S35a in FIG. 10B, which indicates the lighting state after the completion of all of the steps S35a1, S35a3 and S35a4. By performing sequential lighting where the lighting goes around the vehicle 10 by using a plurality of lamps having different functions, it is possible to achieve a dramatic effect of causing the contour of the vehicle to emerge while the lighting runs around this contour.

Next, a control is performed to emphasize the lighting pattern that is visually recognized as a dynamical lighting that is a process of sequentially turning on lamps so that the lighting moves from the side closer to the occupant H to the side farther from the occupant H in the step S35a, in which the initial sequential lighting is performed. That is, a subroutine that is a step S35b for performing the second turn by sequentially turning off lamps is performed. By performing the temporal turning-off in sequence, a flow, where the lighting in sequence goes around the vehicle, is sensed by an observer. This control method is also described as being included in the sequential lighting.

Specifically, a step (S35b1) where the lighting control device 1 generates and outputs control signals for temporarily and sequentially turning off the right front turn-signal lamp 104a, the right front position lamp, and the right front headlamp 102a (functioning as a low beam lamp) is performed. Next, lamps located farther from the occupant H and on the vehicle front side, which is as the same side as the occupant H, i.e. lamps on the vehicle front left side are temporarily and sequentially turned off. Specifically, a step (S35b2) where the lighting control device 1 generates and outputs control signals for temporarily and sequentially turning off the left front headlamp 102b (functioning as a low-beam lamp), the left front position lamp and the left front turn-signal lamp 104b is performed. Next, a step (S35b3) where the lighting control device 1 generates and outputs control signals for temporarily and sequentially turning off the left rear turn-signal lamp 104d and the left rear tail lamp 109b included in the exterior lamp group 2a farthest from the occupant H is performed. Next, a step (S35b4) where the lighting control device 1 generates and outputs control signals for temporarily and sequentially turning off the right rear tail lamp 109a and the right rear turn-signal lamp 104c, i.e., the right rear lamps, which are on the vehicle rear side closer to the occupant H, is performed. Note that the sequential lighting is not limited to a moving lighting state of only one turn to two turns around the vehicle, and more turns may be performed.

After sequential lighting such as lighting going around the vehicle, the lamps belonging to the interior lamp group 2b are turned on. Specifically, a step (S35c) where the lighting control device 1 generates and outputs control signals for turning on the ambient lamp 104 and the room lamp 110 is performed.

These steps S35a (S35a1 to S35a4), step S35b (S35b1 to S35b4) and step S35c cause the sequential lighting so that the lighting dynamically goes around the vehicle first, thereby illuminating the outline of the vehicle. As a result, the occupant H can recognize the contour of the vehicle emerging from the darkness, and the vehicle form can be emphasized and shown in an appealing manner. Further, by performing the movement of the lighting going around the vehicle by using the plurality of lamps having different functions belonging to the exterior lamp group 2a, it is possible to achieve an impression of the vehicle seeming to have an emotion. Lastly, by also turning on the interior lamp group 2b, it is possible to achieve an effect where the vehicle appears as if it is expressing its thoughts of being ready to welcome the occupant.

Modification

In the first to fifth embodiments, the keyless entry device 3 is used for determination of whether or not the occupant H has approached the vehicle 10 within a predetermined range. However, the presently disclosed subject matter is not limited thereto, and for example, the vehicle light system 100 may be configured to perform control and activation based on a signal received by a switch operation of the first button 11e and the second button 11f that are provided to the portable device 11, the vehicle lighting system 100 regarding this signal as the "information on the present position" of the above-described embodiment. In other words, the keyless entry device 3 outputs information on the present position to the in-vehicle network NW in response to these switching operations. The lighting control device 1 performs the step (S1) of acquiring information on the present position through the in-vehicle network NW. Next, the lighting control device 1 may omit the step (S2) of determining whether the distance to the occupant H carrying the portable device 11 is within the predetermined area E1 outside the vehicle, or the lighting control device 1 may perform a process of determining that the distance is within the predetermined area E1 in the step S2 and of determining that a "Yes" is the determined result.

Further, in the above-mentioned embodiments, the position and the direction of the portable device 11 are determined using the reception strength at the antenna of the keyless entry device 3, but the presently disclosed subject matter is not limited thereto. For example, a security device may be used for this purpose. A vehicle anti-theft security system performs a warning operation and a notification operation on the basis of signals from various sensors provided on the vehicle 10 in response to an impact or the like on the vehicle 10. From among various sensor signals from the sensors provided on the vehicle 10, it is possible to determine whether or not the occupant is within a predetermined range around the vehicle by using a signal from a vehicle surroundings monitoring sensor.

According to the above-described embodiment, when the occupant H having the portable device 11 approaches the vehicle 10, predetermined lamps among the exterior lamp group 2a and the interior lamp group 2b of the vehicle 10 are turned on in a predetermined order, so that various illumination effects can be achieved, thereby enhancing the commercial value.

While embodiments of the presently disclosed subject matter and modifications thereof have been described above, the above-described embodiments and modifications are merely illustrative in all respects. The presently disclosed subject matter is not to be construed as being limited by these descriptions. The presently disclosed subject matter may be embodied in various other forms without departing from the spirit thereof, including additions, omissions, substitutions and other changes. The lamps to be turned on are not limited to the lamps described above. For example, the front and rear license lamps may also be turned on. Further, by dividing the turn-signal lamp into a plurality of light emitting units and sequentially turning on the turn-signal lamp itself, it is possible to improve the commercial value of the vehicle light system by reminding the more intensive impression of flowing.

INDUSTRIAL APPLICABILITY

The presently disclosed subject matter can be applied to lighting devices of vehicles having an interior space such as a four-wheeled vehicle, a truck, or a tricycle.

REFERENCE SIGNS LIST

1 . . . lighting control device
2 . . . lamp group
2a . . . exterior lamp group
2b . . . interior lamp group
3 . . . keyless entry device
4 . . . CPU
5 . . . ROM
6 . . . RAM
7 . . . light source driving unit
10 . . . vehicle
10a . . . door
11 . . . portable device
11a . . . portable device transmitter
11b . . . portable device receiver
11c . . . CPU (portable device control unit)
11d . . . memory
11e . . . button for transmitting unlock signal
11f . . . button for transmitting lock signal
12 . . . vehicle-side device
12a . . . vehicle-side transmitter
12b . . . vehicle-side receiver 12c . . . vehicle-side control unit (ECU)

12d . . . memory

12e . . . door lock control unit

12f . . . distance detecting unit

13 . . . door lock actuator (door lock mechanism)

E1 . . . first area line

E2 . . . second area line

H . . . occupant

D1 . . . distance (or range) (radius) of first area line

D2 . . . distance (or range) (radius) of second area line

The invention claimed is:

1. A vehicle light system comprising:

a vehicle lamp group including an exterior lamp group including a plurality of lamps configured to illuminate an outside of a vehicle, and that include a lamp arranged in a front part of a vehicle and a lamp arranged in a rear part of the vehicle, and an interior lamp group including a plurality of lamps configured to illuminate an inside of the vehicle and that include at least a room lamp and an ambient lamp, wherein each of the lamps is provided with at least one light source;

a lighting controller configured to generate and output a control signal for controlling turning on and off of the pluralities of lamps included in the vehicle lamp group;

a light source driver configured to receive the control signal output from the lighting controller, and to drive, based on the control signal, the light source of a predetermined lamp among the pluralities of lamps of the vehicle lamp group;

an in-vehicle device that is to be mounted on the vehicle and that has a wireless communication function;

a portable device that an occupant of the vehicle can bring outside the vehicle and that has a wireless communication function with the in-vehicle device; and an in-vehicle network configured to connect the in-vehicle device and the lighting controller, wherein:

the in-vehicle device outputs positional information about the portable device based on wireless communication information with the portable device to the in-vehicle network, the lighting controller configured to acquire the positional information through the in-vehicle network, the lighting controller configured to output a first control signal for controlling the exterior lamp group, and output a second control signal for controlling the interior lamp group, when a distance between the portable device and the vehicle is shorter than a predetermined distance, the light source driver is configured to drive a light source of a predetermined lamp among the plurality of lamps of the exterior lamp group based on the first control signal to bring the vehicle into a first illumination state; and after the vehicle is in the first illumination state, the light source driver is configured to drive a light source of a predetermined lamp among the plurality of lamps of the interior lamp group based on the second control signal to bring the vehicle into a second illumination state, and thereby illuminate the vehicle so as to cause the occupant carrying the portable device to recognize the design of the vehicle, wherein the in-vehicle device outputs information related to a direction of movement of the portable device and a distance between the portable device and the in-vehicle device as positional information about the portable device to the in-vehicle network;

the first control signal is a signal for controlling the plurality of lamps so that the plurality of lamps of the exterior lamp group light up starting from a light source of a lamp close to the portable device, and the light sources of the plurality of lamps in the vicinity are controlled so as to be sequentially turned on, in a manner where the light sources light up, starting from the closest and going around the vehicle periphery; and the second control signal is a control signal for controlling a light source of at least either the room lamp or the ambient lamp among the plurality of lamps of the interior lamp group, where in this light source is to be turned on while continuously maintaining a predetermined light intensity.

2. A vehicle light system comprising:

a vehicle lamp group including an exterior lamp group including a plurality of lamps configured to illuminate an outside of a vehicle, and that include a lamp arranged in a front part of a vehicle and a lamp arranged in a rear part of the vehicle, and an interior lamp group including a plurality of lamps configured to illuminate an inside of the vehicle and that include at least a room lamp and an ambient lamp, wherein each of the lamps is provided with at least one light source;

a lighting controller configured to generate and output a control signal for controlling turning on and off of the pluralities of lamps included in the vehicle lamp group;

a light source driver configured to receive the control signal output from the lighting controller, and to drive, based on the control signal, the light source of a predetermined lamp among the pluralities of lamps of the vehicle lamp group;

an in-vehicle device that is to be mounted on the vehicle and that has a wireless communication function;

a portable device that an occupant of the vehicle can bring outside the vehicle and that has a wireless communication function with the in-vehicle device; and an in-vehicle network configured to connect the in-vehicle device and the lighting controller, wherein:

the in-vehicle device outputs positional information about the portable device based on wireless communication information with the portable device to the in-vehicle network, the lighting controller configured to acquire the positional information through the in-vehicle network, the lighting controller configured to output a first control signal for controlling the exterior lamp group, and output a second control signal for controlling the interior lamp group, when a distance between the portable device and the vehicle is shorter than a predetermined distance, the light source driver is configured to drive a light source of a predetermined lamp among the plurality of lamps of the exterior lamp group based on the first control signal to bring the vehicle into a first illumination state; and after the vehicle is in the first illumination state, the light source driver is configured to drive a light source of a predetermined lamp among the plurality of lamps of the interior lamp group based on the second control signal to bring the vehicle into a second illumination state, and thereby illuminate the vehicle so as to cause the occupant carrying the portable device to recognize the design of the vehicle, wherein:

the lamp disposed in the front part of the vehicle includes a lamp provided at a front corner of the vehicle, and a lamp disposed in the rear part of the vehicle includes a lamp provided at a rear corner of the vehicle; and the light source controlled based on the first control signal is a light source of a lamp, among the lamp provided at the front corner of the vehicle and the lamp provided at the rear corner of the vehicle, that is closer to a position of the portable device indicated by the positional information.

3. The vehicle light system according to claim 2, wherein:

the first control signal is (A) a control signal for gradually increasing a light intensity of a light source of a predetermined lamp among the plurality of lamps of the exterior lamp group from an off state to turn on the light source, or (B) a control signal for turning on a light source of a predetermined lamp among a plurality of lamps of the exterior lamp group from an off-state to a lighting state at a predetermined light intensity, and then gradually decreasing the light intensity; and the second control signal is a control signal for turning on and continuously maintaining, at a predetermined light intensity, a light source of either the room lamp or ambient lamp among the plurality of lamps of the interior lamp group.

4. The vehicle light system according to claim 2, wherein:

the lighting controller configured to output a third control signal between a period in which the first illumination state is maintained and a period in which the second illumination state is maintained, and the light source driver configured to drive a light source of a predetermined lamp in the vehicle lamp group based on the third control signal to bring the vehicle into a third illumination state.

5. The vehicle light system according to claim 3, wherein:

the lighting controller configured to output a third control signal between a period in which the first illumination state is maintained and a period in which the second illumination state is maintained, and the light source driver configured to drive a light source of a predetermined lamp in the vehicle lamp group based on the third control signal to bring the vehicle into a third illumination state.

6. The vehicle light system according to claim 4, wherein the third control signal is a control signal for controlling driving of at least one light source of the room lamp and the ambient lamp to cause the light source to be turned on by gradually increasing the light intensity.

7. The vehicle light system according to claim 5, wherein the third control signal is a control signal for controlling driving of at least one light source of the room lamp and the ambient lamp to cause the light source to be turned on by gradually increasing the light intensity.

8. The vehicle light system according to claim 1, wherein the third control signal is a control signal for performing a control operation whereby driving of at least one light source of the room lamp and the ambient lamp causes the light source to be turned on by a gradual increase in the light intensity, after which a predetermined light intensity is maintained in the predetermined lamp, which is turned on by the first control signal, and the lighting state is continued.

9. The vehicle light system according to claim 1, wherein the light source of the lamp is an LED.

10. The vehicle light system according to claim 2, wherein the light source of the lamp is an LED.

11. The vehicle light system according to claim 1, wherein the lamp close to the portable device among the plurality of lamps of the exterior lamp group includes at least one selected from the group consisting of a headlamp, a fog lamp, a cornering lamp, a turn-signal lamp, a lamp configured to illuminate a vicinity of a foot of an occupant, a rear lamp, a license lamp, and a rear tail lamp.

12. The vehicle light system according to claim 2, wherein the lamp close to the portable device among the plurality of lamps of the exterior lamp group includes at least one selected from the group consisting of a headlamp, a fog lamp, a cornering lamp, a turn-signal lamp, a lamp configured to illuminate a vicinity of a foot of an occupant, a rear lamp, a license lamp, and a rear tail lamp.

13. The vehicle light system according to claim 1, wherein the lamp provided at the rear corner of the vehicle is a lamp capable of illuminating an area in an oblique forward or oblique rearward direction of the vehicle and includes at least one selected from the group consisting of a fog lamp, a cornering lamp, a turn-signal lamp, a lamp configured to illuminate a vicinity of a foot of an occupant, a rear lamp, a license lamp, and a rear tail lamp.

14. The vehicle light system according to claim 2, wherein the lamp provided at the rear corner of the vehicle is a lamp capable of illuminating an area in an oblique forward or oblique rearward direction of the vehicle and includes at least one selected from the group consisting of a fog lamp, a cornering lamp, a turn-signal lamp, a lamp configured to illuminate a vicinity of a foot of an occupant, a rear lamp, a license lamp, and a rear tail lamp.

* * * * *